March 27, 1973    J. S. BENJAMIN    3,723,092
COMPOSITE METAL POWDER AND PRODUCTION THEREOF
Filed Sept. 28, 1970    13 Sheets-Sheet 1
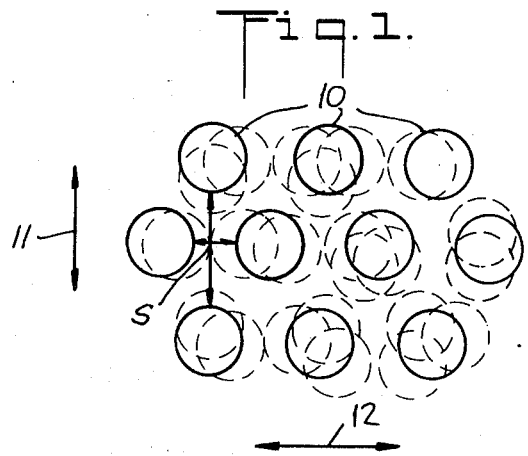
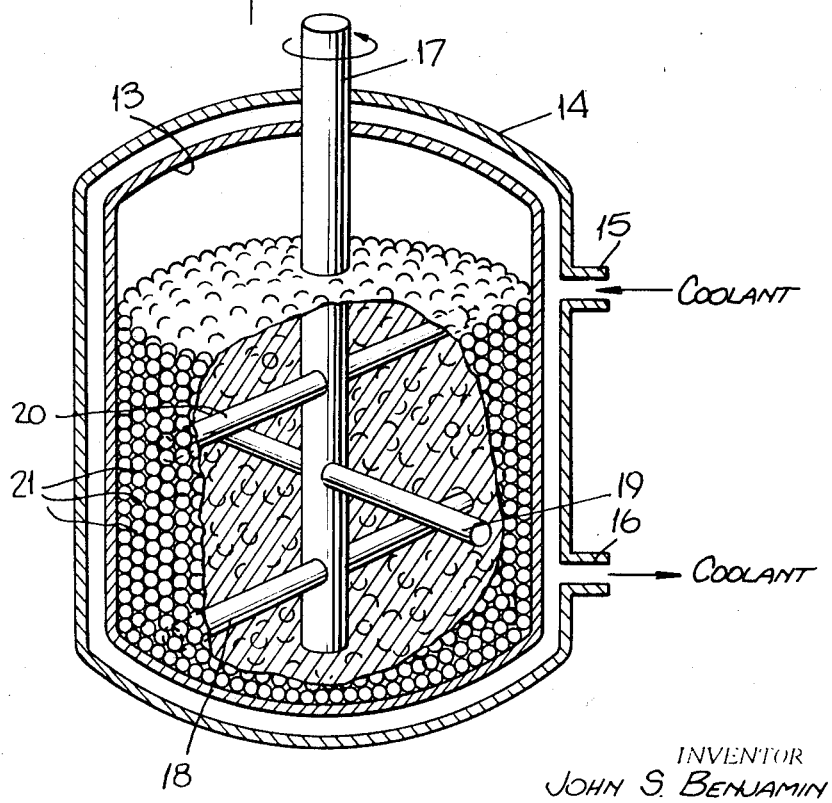
INVENTOR
JOHN S. BENJAMIN
ATTORNEY

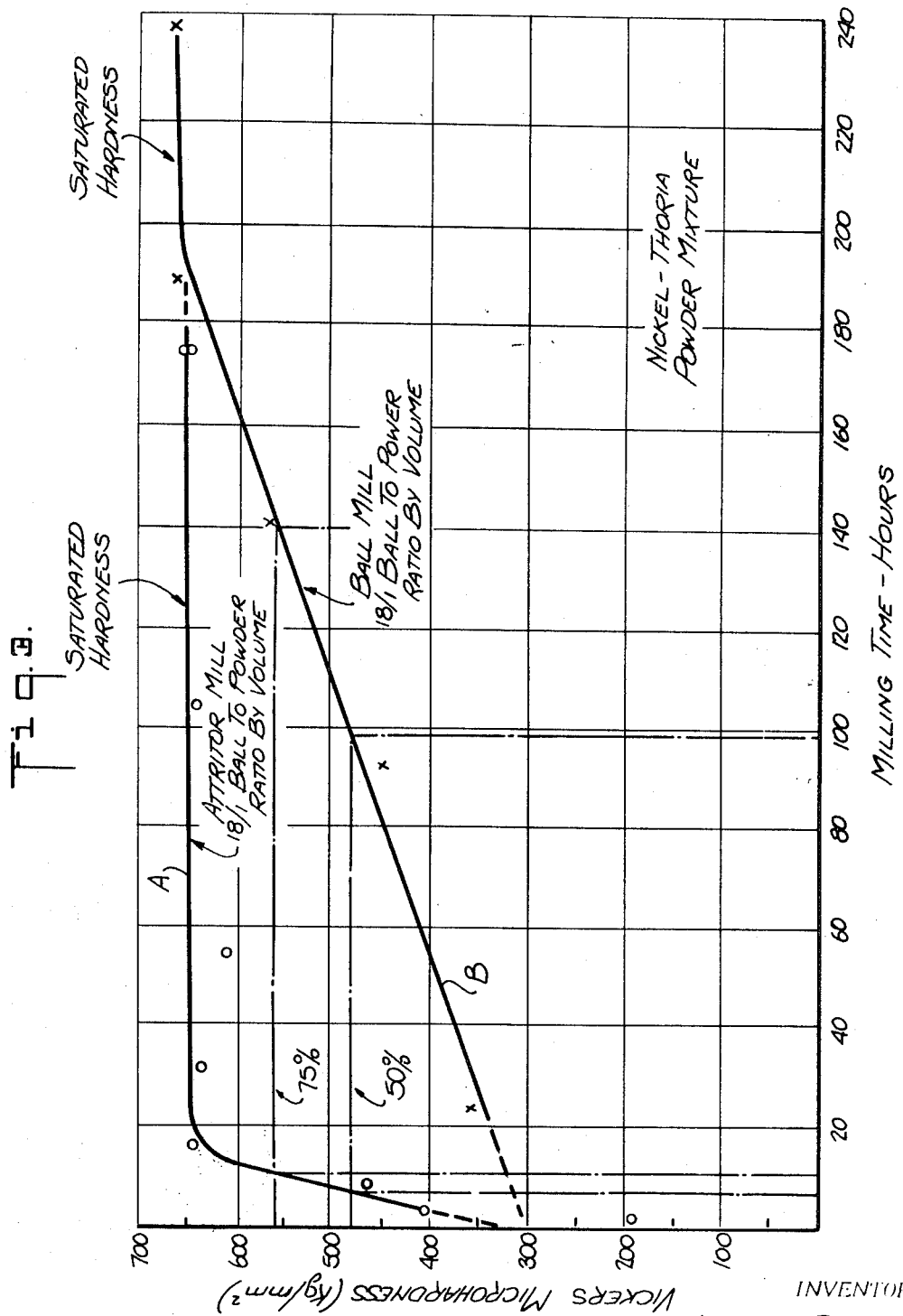

Fig.4.
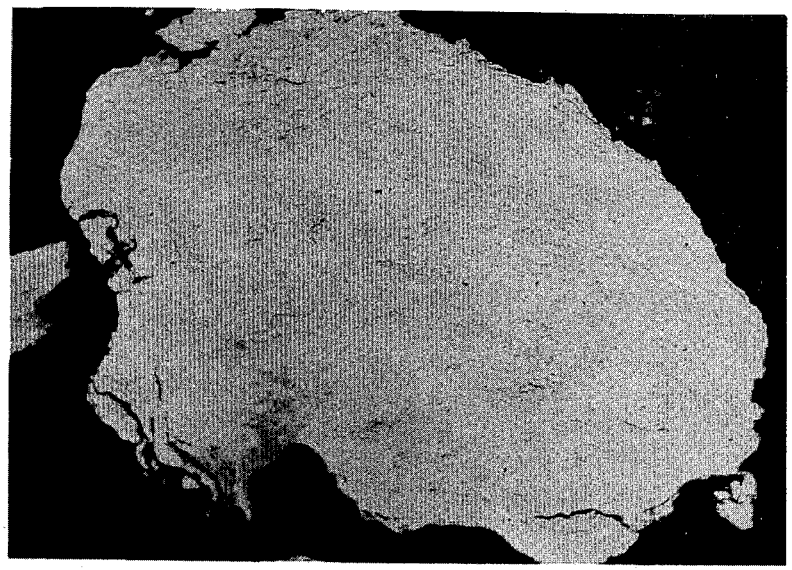
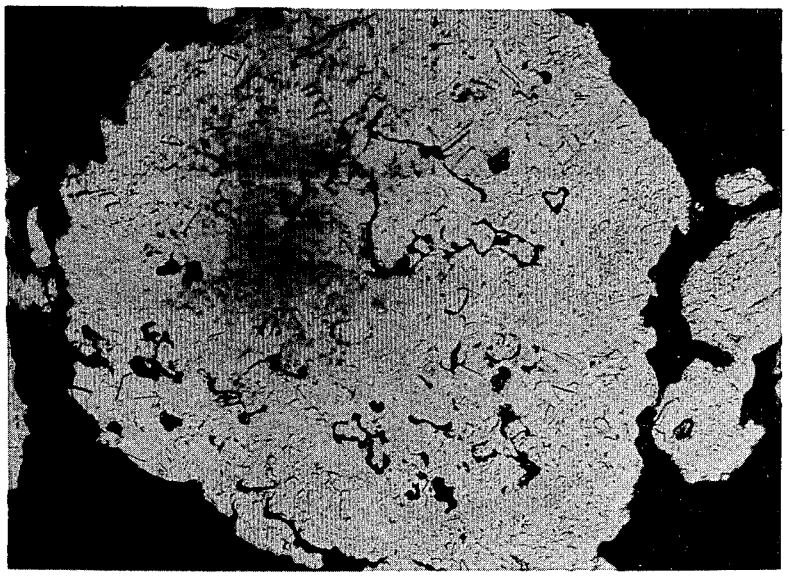
Fig.5

Fig. 6.
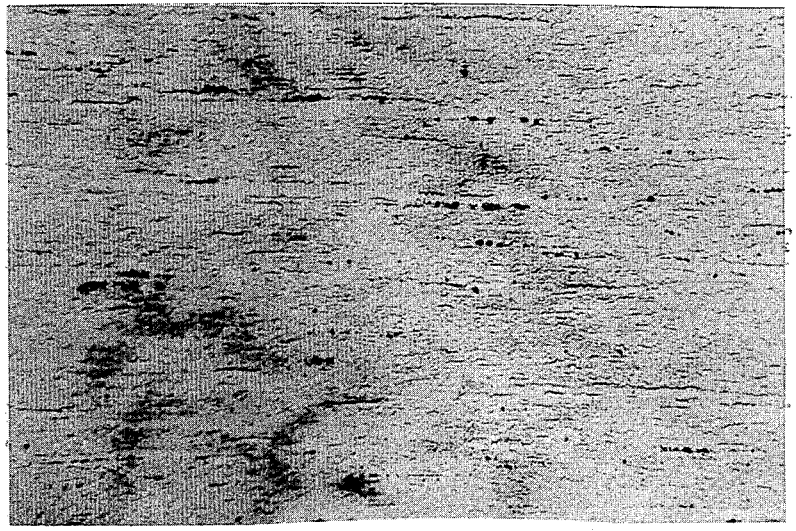
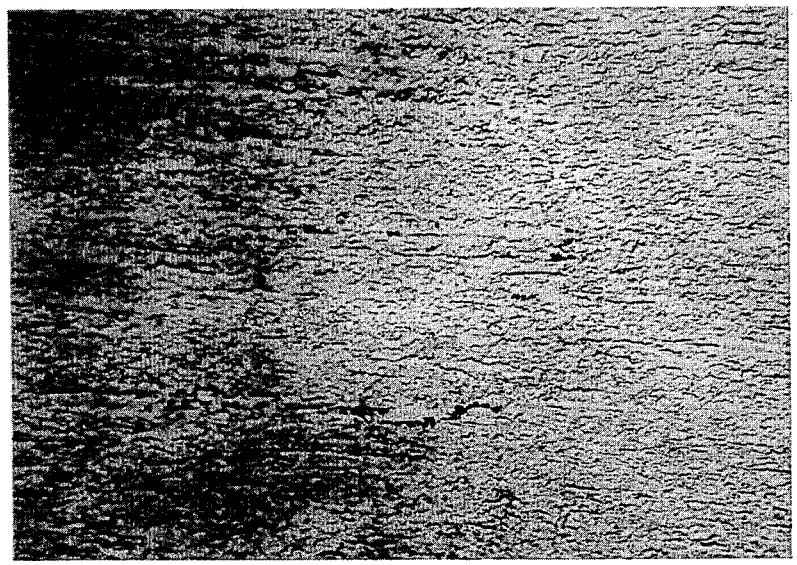
Fig. 7.

Fig. 8.
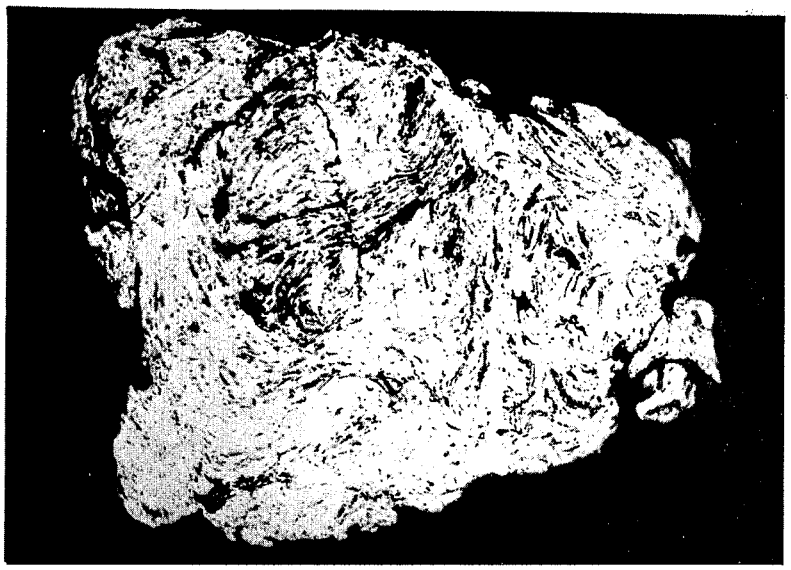
Fig. 9.

Fig. 12.
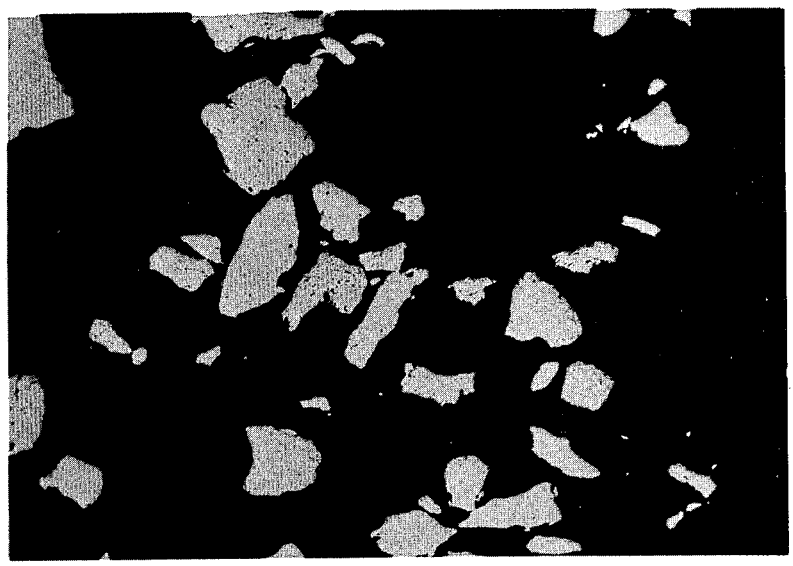
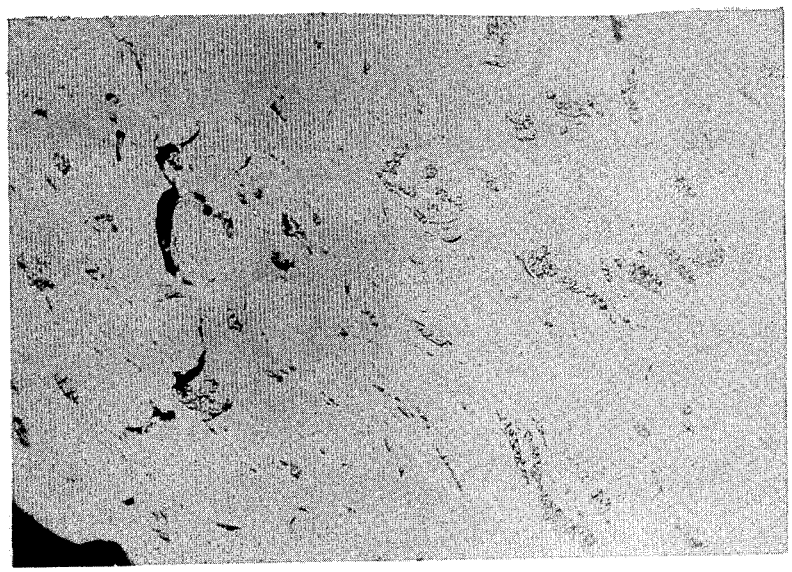
Fig. 13.

Fig.14.
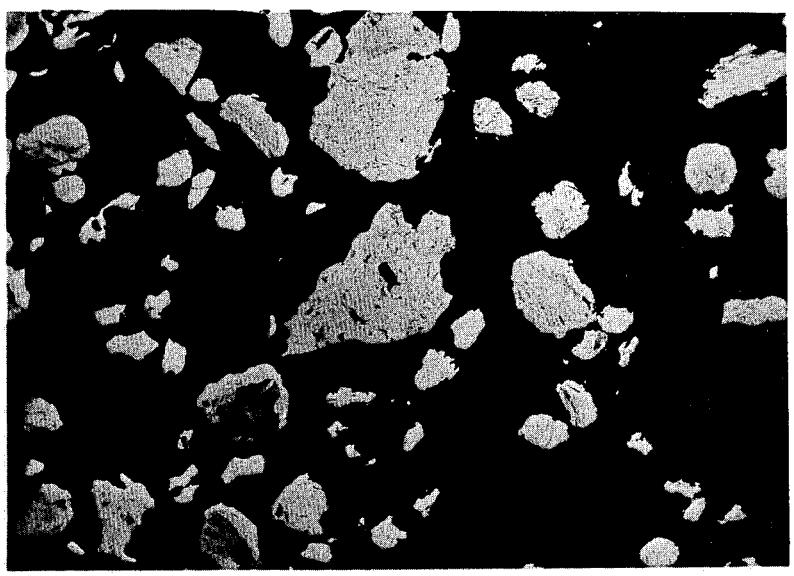
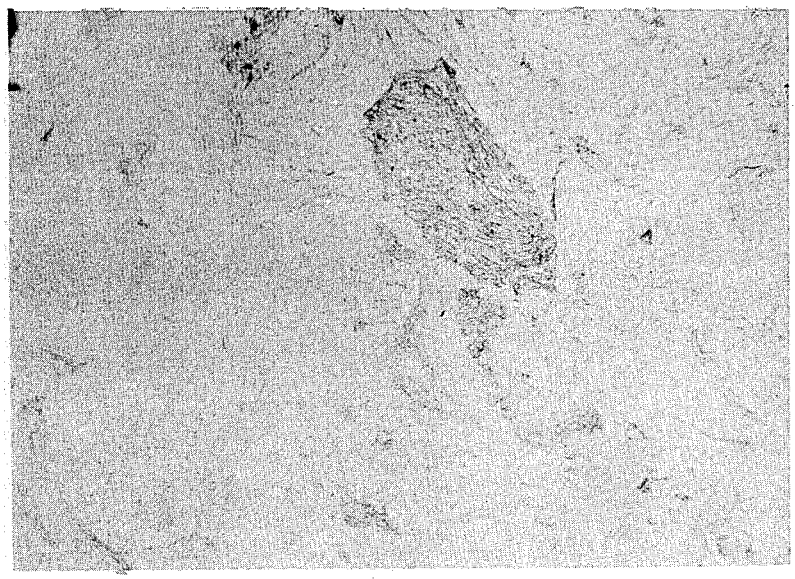
Fig.15.

Fig.16.
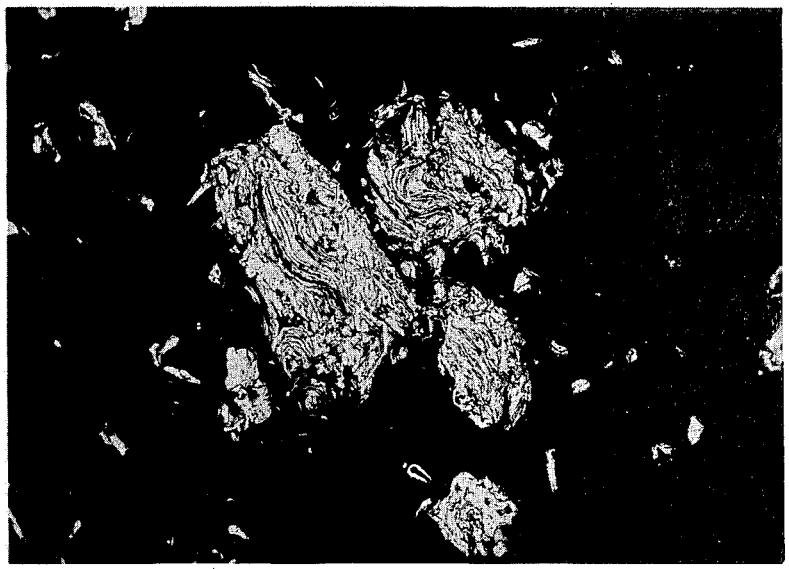
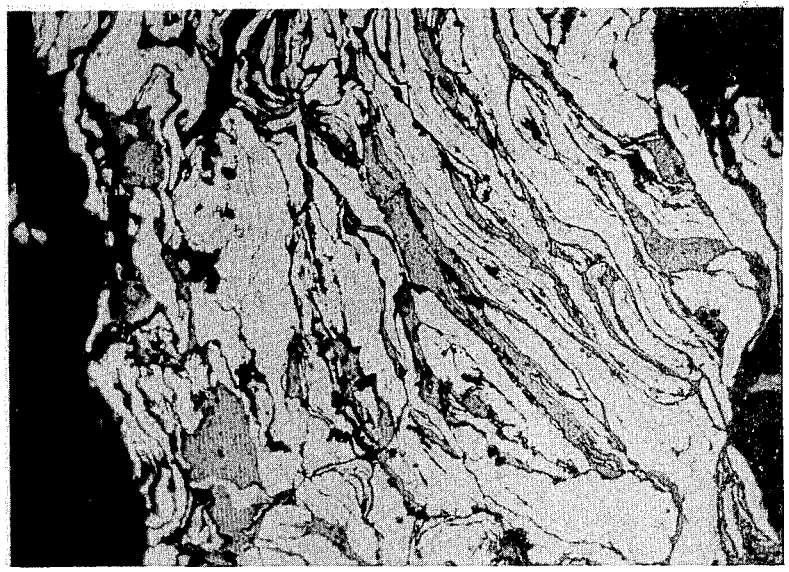
Fig.17.

March 27, 1973  J. S. BENJAMIN  3,723,092
COMPOSITE METAL POWDER AND PRODUCTION THEREOF
Filed Sept. 28, 1970  13 Sheets-Sheet 12
Fig. 20.
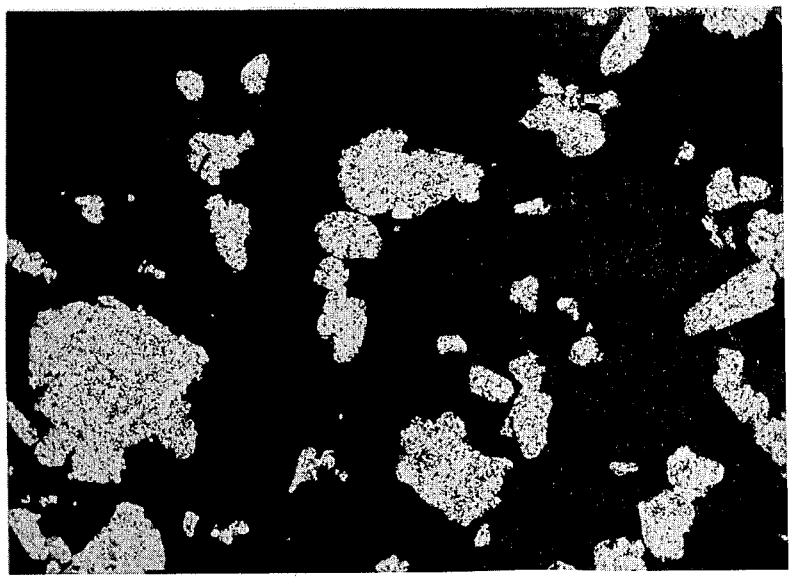
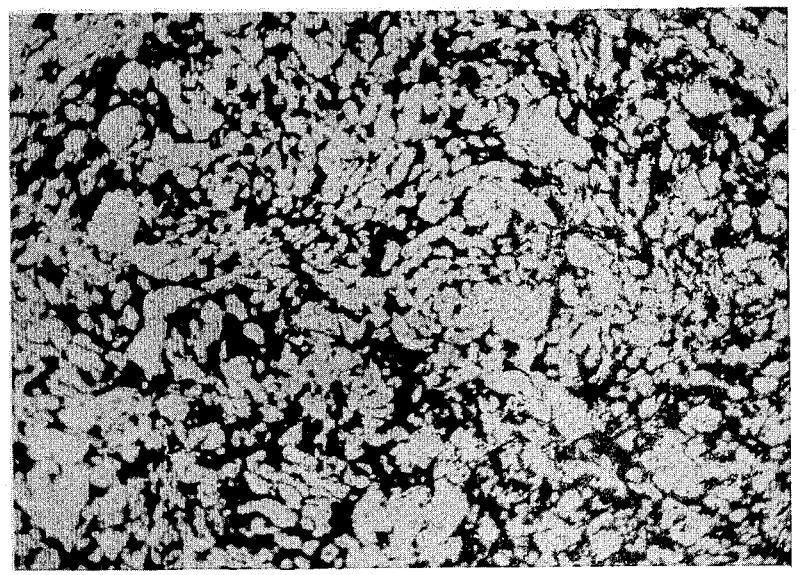
Fig. 21.
INVENTOR.
JOHN S. BENJAMIN
M. L. Pinel
ATTORNEY Fig.22.
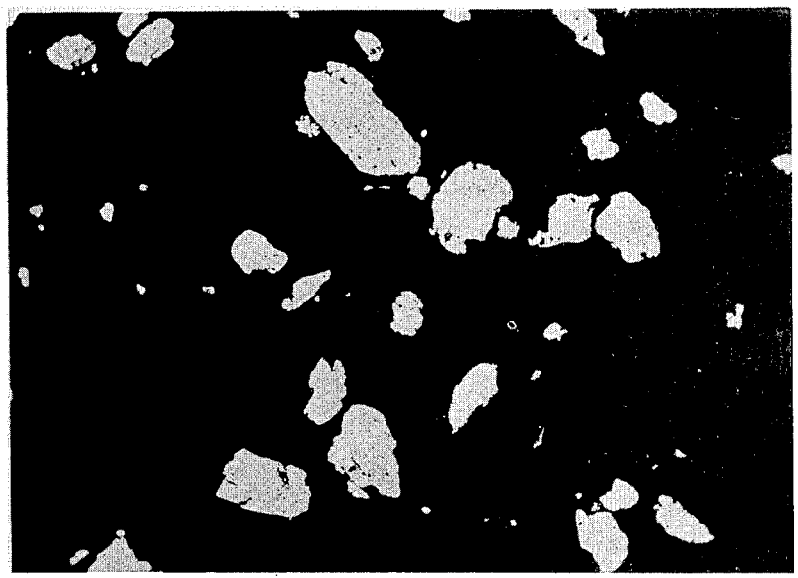
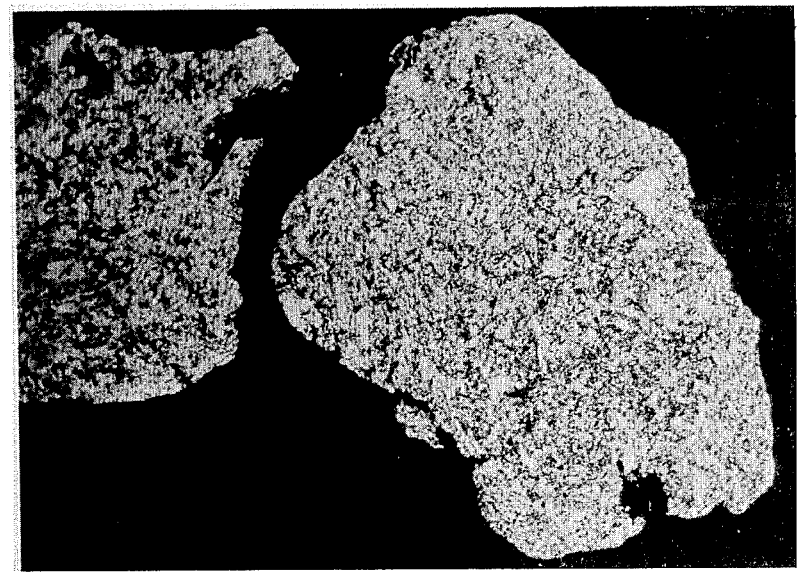
Fig.23.
INVENTOR.
JOHN S. BENJAMIN
M. L. Pinel
ATTORNEY

United States Patent Office 3,723,092
Patented Mar. 27, 1973

3,723,092
COMPOSITE METAL POWDER AND
PRODUCTION THEREOF
John Stanwood Benjamin, Suffern, N.Y., assignor to The
International Nickel Company, Inc., New York, N.Y.
Continuation-in-part of application Ser. No. 709,700, Mar.
1, 1968, now Patent No. 3,591,362. This application
Sept. 28, 1970, Ser. No. 75,882
Int. Cl. B22f 9/00
U.S. Cl. 75—.5 R                    27 Claims

ABSTRACT OF THE DISCLOSURE

A wrought composite metal powder, or mechanically alloyed metal powder, is provided comprised of a plurality of constituents, at least one of which is a metal capable of being compressively deformed, the composite powder being preferably in the heavily cold worked condition, i.e., having substantially the saturation hardness for the system involved, the particles thereof being characterized metallographically by an internal structure comprised of the starting constituents intimately united together and identifiably mutually interdispersed. The process employed in producing the composite metal powder resides in providing a dry charge of attritive elements and a powder mass comprising a plurality of constituents, at least one of which is a metal capable of being compressively deformed, subjecting the charge to agitation milling under high energy conditions in which a substantial portion or cross section of the charge is maintained kinetically in a highly activated state of relative motion, and continuing the milling to produce wrought composite metal powder in which particles thereof have substantially the saturation hardness for the system involved.

---

The present application is a continuation-in-part of U.S. application Ser. No. 709,700, filed Mar. 1, 1968, which is now U.S. Pat. No. 3,591,362, issued July 6, 1971.

This invention relates to the production of wrought composite metal particles for use in the production of powder metallurgy products and, in particular, to a heavily cold worked composite metal powder in which particles thereof are comprised of a plurality of interdispersed constituents intimately united together, at least one of which constituents is a metal capable of being compressively deformed.

The present invention is directed to a new and improved process whereby many alloy systems can be made readily and economically available in the form of a composite metal powder, including simple and complex alloy systems, precipitation-hardenable alloy systems, dispersion strengthened metal systems, immiscible metal systems, and even cermet-type compositions containing a dispersion strengthened metal matrix.

The invention is based on the discovery that certain wrought composite metal powders provide unexpected and advantageous properties and/or structures and have internally interdispersed therein a plurality of constituents and can be made without resorting to the use of elevated temperature diffusion processes, chemical co-precipitation and reduction processes, or the like processes.

It is an object of the present invention to provide a mechanically alloyed metal powder comprising a plurality of constituents, at least one of which is a metal having the characteristic of being compressively deformable.

Another object is to provide a mechanically alloyed metal powder of substantially saturation hardness which metallographically is characterized by a microstructure comprising a plurality of mutually interdispersed constituents, at least one of which is a metal which is compressively deformable.

A further object is to provide a wrought composite metal powder comprising at least two metals of limited solubility internally interdispersed within substantially each composite metal particle.

A still further object is to provide mechanically alloyed metal powder characterized metallographically by a striated structure.

The invention also provides as an object a coarse mechanically alloyed metal particle comprising internally a plurality of substantially mutually interdispersed constituents, at least one of which is a metal which is compressively deformable, at least one other constituent being a non-metal.

It is a further object of the invention to provide mechanically alloyed metal powders having a superalloy composition providing simultaneously precipitation hardening and dispersion strengthening.

These and other objects and advantages of the invention will become apparent from the following description when taken in conjunction with the drawing, in which:

FIG. 1 depicts schematically a ball charge in a kinetic state of random collision;

FIG. 2 is a schematic representation of an attritor of the stirred ball mill type capable of providing agitation milling to produce composite metal particles in accordance with the invention;

FIG. 3 is illustrative of dry milling curves showing the variation in hardness of composite metal particles of Ni-ThO$_2$ as a function of milling time for two types of dry milling devices;

FIG. 4 is a reproduction of a photomicrograph taken at 750 diameters depicting the microstructure of a wrought nickel-thoria composite metal particle produced in accordance with the invention;

FIG. 5 is a reproduction of a photomicrograph taken at 750 diameters illustrating the structure of a particle from the same batch of material depicted in FIG. 4 after the powder was annealed in argon for 16 hours at 1200° C;.

FIG. 6 is a reproduction of a photograph taken at 750 diameters showing the structure of a wrought product produced by hot extruding the powder shown in FIG. 4;

FIG. 7 is a reproduction of a photomicrograph taken at 750 diameters of hot extruded thoriated nickel alloy produced in the same manner as the material of FIG. 6 except that the composite metal powder employed was milled for a longer time;

FIG. 8 is a reproduction of a photomicrograph taken at 750 diameters showing the structure of the alloy depicted in FIG. 7 after cold swaging to provide a reduction in area of 75%;

FIG. 9 is a reproduction of a photomicrograph taken at 750 diameters of a thoriated nickel-chromium-aluminum-titanium alloy powder milled in argon;

FIG. 12 is a reproduction of a photomicrograph taken at 100 diameters of composite metal particles of thoriated nickel-chromium-aluminum-titanium alloy after milling for about 16 hours in accordance with the invention;

FIG. 13 is the same as FIG. 12 except that the photomicrograph is taken at 1000 diameters;

FIG. 14 is a reproduction of a photomicrograph taken at 100 diameters of the material shown in FIG. 12 after a milling time of about 48 hours;

FIG. 15 is a reproduction of a photomicrograph of the same material of FIG. 14 taken at 1000 diameters after a milling time of about 48 hours;

FIG. 16 is a reproduction of a photomicrograph taken at 100 diameters of wrought composite metal particles of iron-copper after milling in accordance with the invention;

FIG. 17 is a reproduction of a photomicrograph taken at 750 diameters of the same material shown in FIG. 16;

FIG. 20 is a reproduction of a photomicrograph taken at 100 diameters of wrought composite metal particles of copper-lead after milling in accordance with the invention;

FIG. 21 is a reproduction of a photomicrograph of the same material shown in FIG. 20 but taken at 750 diameters;

FIG. 22 is a reproduction of a photomicrograph taken at 100 diameters of wrought composite metal particles of lead-copper similar to FIG. 20 except that the milling time is three times that employed in producing the particles illustrated in FIG. 20; and FIG. 23 is a reproduction of a photomicrograph taken at 750 diameters of the same material shown in FIG. 22.

Figure 10:
FIG. 10 is a reproduction of a photomicrograph taken at 100 diameters showing in longitudinal section a microstructure of a thoriated complex superalloy made from powder produced in accordance with the invention after heat treatment at 2250° F. for 4 hours in argon followed by furnace cooling.

Generally speaking, the present invention is directed to the production of wrought composite metal particles wherein a plurality of starting constituents in the form of powders, at least one of which is a compressively deformable metal, are intimately united together to form a mechanical alloy within individual particles without melting any one or more of the constituents. By the term "mechanical alloy" is meant that state which prevails in a composite metal particle produced in accordance with the invention wherein a plurality of constituents in the form of powders, at least one of which is a compressively deformable metal, are caused to be bonded or united together by the application of mechanical energy in the form of a plurality of repeatedly applied compressive forces sufficient to vigorously work and deform at least one deformable metal and cause it to bond or weld to itself and/or the remaining constituents, be they metals and/or non-metals, whereby the constituents are intimately united together and identifiably codisseminated throughout the internal structure of the resulting composite metal particles.

As more fully discussed hereinafter, the mechanically alloyed metal particles have a characteristic high hardness of a substantially saturation level; i.e., the hardness level for the system involved beyond which further working does not substantially increase the hardness of the particles. Substantial saturation hardness is particularly useful in conjunction with metal systems having melting points exceeding about 600° K., e.g., metal systems having melting points exceeding 1000° K.

The process employed for producing mechanically alloyed particles comprises providing a mixture of a plurality of powdered constituents, at least one of which is a compressively deformable metal, and at least one other constituent is selected from the group consisting of a non-metal and another chemically distinct metal, and subjecting the mixture to the repeated application of compressive forces, for example, by agitation milling under dry conditions in the presence of attritive elements maintained kinetically in a highly activated state of relative motion, and continuing the dry millng for a time sufficient to cause the constitutents to comminute and bond or weld together and codisseminate throughout the resulting metal matrix of the product powder. This occurs when the mechanically alloyed powder particles reach substantially the saturation hardness level. The mechanical alloy produced in this manner is characterized metallographically by a cohesive internal structure in which the constituents are intimately united to provide an interdispersion of comminuted fragments of the starting constituents. The particles are produced in a heavily cold worked condition and exhibit a microstructure characterized by closely spaced striations.

It has ben found particularly advantageous in obtaining optimum results to employ agitation milling under high energy conditions in which a substantial portion of the mass of the attritive elements is maintained kinetically in a highly activated state of relative motion. However, the milling need not be limited to such conditions so long as the milling is sufficiently energetic to result in substantially saturation hardness.

As will be appreciated, in processing powders in accordance with the invention, countless numbers of individual particles are involved. Similarly, usual practice requires a bed of grinding media containing a large number of individual grinding members, e.g., balls. Since the particles to be contacted must be available at the collision site between grinding balls or between grinding balls and the wall of mill or container, the process is statistical and time dependent.

One of the attributes of the type of high energy working employed in carrying out the invention is that some metals normally considered brittle when subjected to conventional working techniques, e.g., hot or cold rolling, forging, and the like, are capable of being deformed when subjected to impact compression by energized attritive elements in an attritor mill. An example is chromium powder which was found to exhibit cold workability and compressive deformability when subjected to milling in accordance with the method of the invention. Compressively deformable metals are capable of exhibiting a true compressive strain ($e_t$) as determined by the relationship $$e_t = \ln\left(\frac{t_o}{t}\right)$$

where $\ln$ = natural logarithm, $t_o$ = original thickness of the fragment and $t$ = final thickness of the fragment, well in excess of 1.0, e.g., 1.0 to 3.0 or even much more.

AGITATION MILLING

By the term "agitation milling," or "high energy milling" is meant that condition which is developed in the mill when sufficient mechanical energy is applied to the total charge such that a substantial portion of the attritive elements, e.g., ball elements, are continuously and kinetically maintained in a state of relative motion. For optimum results, it has been found advantageous to maintain a major portion of the attritive elements out of static contact with each other; that is to say, maintained kinetically activated in random motion so that a substantial number of elements repeatedly collide with one another. It has been found advantageous that at least about 40%, e.g., 50% or 70% or even 90% or more, of the attritive elements should be maintained in a highly activated state. While the foregoing preferred condition usually does not prevail in a conventional ball mill in which a substantial portion of the ball elements is maintained in static bulk contact with each other, it is possible to employ such mills in carrying out the invention provided there is sufficient activation of attritive elements in the cascading zone and also, provided the volume ratio of attritive elements to the charge is large, for example, 10 to 1 and higher, e.g., 18 to 1.

The composite metal particles produced in accordance with the invention exhibit an increase in hardness with milling time.

For optimum results, the amount of cold work is that beyond which further milling does not further increase the hardness, this hardness level having been referred to hereinbefore as "saturation hardness."

As illustrative of one type of attritive condition, reference is made to FIG. 1 which shows a batch of ball elements 10 in a highly activated state of random momentum by virtue of mechanical energy applied multidirectionally as shown by arrows 11 and 12, the transitory state of the balls being shown in dotted circles. Such a condition can be simulated in a vibratory mill. Another mill is a high speed shaker mill oscillated at rates of up to 1200 cycles or more per minute wherein attritive elements are accelerated to velocities of up to about 300 centimeters per second (cm./sec.).

A mill found particularly advantageous for carrying out the invention is a stirred ball mill attritor comprising an axially vertical stationary cylinder having a rotatable agitator shaft located coaxially of the mill with spaced agitator arms extending substantially horizontally from the shaft. A mill of this type is described in the Szegvari U.S. Patent No. 2,764,359 and in Perry's Chemical Engineer's Handbook, Fourth Edition, 1963, at pages 8–26. A schematic representation of this mill is illustrated in FIG. 2 of the drawing which shows in partial section an upstanding cylinder 13 surrounded by a cooling jacket 14 having inlet and outlet ports 15 and 16, respectively, for circulating a coolant, such as water. A shaft 17 is coaxially supported within the cylinder by means not shown and has horizontal extending arms 18, 19 and 20 integral therewith. The mill is filled with attritive elements, e.g., balls 21, sufficient to bury at least some of the arms so that, when the shaft is rotated, the ball charge by virtue of the agitating arms passing through it is maintained in a continual state of unrest or relative motion throughout the bulk thereof.

The dry milling process of the invention is statistical and time dependent as well as energy input-dependent, and milling is advantageously conducted for a time sufficient to secure a substantially steady state between the particle growth and particle comminution factors, as well as particle hardness. If the specific energy input rate in the milling device is not sufficient, such as prevails in conventional ball milling practice for periods up to 24 or 36 hours, a compressively deformable powder will generally not change in apparent particle size. At a slightly higher energy input level, sufficient to promote welding but not fracture of metal particles, the metal powder charge tends to cake and/or weld to the inside of the device and to the grinding medium. It is accordingly to be appreciated that the energy input level should advantageously exceed that required to achieve particle growth, for example, by a factor of 5, 10 or 25, such as described for the attritor mill hereinbefore. In such circumstances, the ratio of the grinding medium diameter to the average particle diameter is large, e.g., 50 times or more, and preferably is 250 times or more. Thus, using as a reference a mixture of carbonyl nickel powder having a Fisher subsieve size of about 2 to 7 microns mixed with about 2.5% by volume of less than 0.1 micron thoria powder, the energy level in dry milling in the attritor mill, e.g., in air, should be sufficient to provide a maximum particle size in less than 24 hours. Upon further milling, the powder should gradually decrease in average size. A mill of the attritor type with rotating agitator arms and having a capacity of holding one gallon volume of carbonyl nickel balls of plus ¼ inch and minus ½ inch diameter with a ball-to-powder volume ratio of about 20 to 1, and with the impeller driven at a speed of about 180 revolutions per minute (r.p.m.) in air, will provide the required energy level. When dry milled under these energy conditions without replacement of the air atmosphere, the average particle size of the reference powder mixture will increase to an average particle size of between about 100 to 125 microns in about 24 hours. Further dry milling under the same energy conditions resulted in a gradual reduction in average particle size to about 40 to about 80 microns as grinding continued from 24 to about 72 hours. A conventional ball mill loaded with the same weight of nickel balls and substantially the same ball-to-powder loading generally accomplishes a mixing of the powders with some incidental flattening of the nickel powders and negligible change in product particle size after up to 24 or 36 hours grinding in air.

Attritor mills, vibratory ball mills, planetary ball mills, and some ball mills depending upon the ball-to-powder ratio and mill size, are capable of providing energy input within a time period and at a level required in accordance with the invention. In mills containing grinding media, it is preferred to employ metal or cemet elements or balls, e.g., steel, stainless steel, nickel, tungsten carbide, etc., of relatively small diameter and of essentially the same size. The volume of the powders being milled should be substantially less than the dynamic interstitial volume between the attritive elements, e.g., the balls, when the attritive elements are in an activated state of relative motion. Thus, referring to FIG. 1, the dynamic interstitial volume is defined as the sum of the average volumetric spaces S between the balls while they are in motion, the space between the attritive elements or balls being sufficient to allow the attritive elements to reach sufficient momentum before colliding. In carrying out the invention, the volume ratio of attritive elements to the powder should advantageously be over about 4 to 1 and, more advantageously, at least about 10 to 1, so long as the volume of powder does not exceed about one-quarter of the dynamic interstitial volume between the attritive elements. It is preferred in practice to employ a volume ratio of about 12 to 1 to 50 to 1.

By working over the preferred volume ratio of 12 to 1 to 50 to 1 on a powder system in which at least one constituent is a cold workable metal, a high degree of mechanical alloying is generally obtained where the deformable metal powder has a melting point above 600° K. and, particularly above 1000° K. In addition, wrought products produced from the powders exhibit highly improved properties. Milling tends to increase the particle size and, as the particle size increases, the composition of each particle approaches the average composition of the starting mixture. An indication that satisfactory operating conditions have been achieved is the point at which a substantial proportion of the product powders, e.g., 50% or 75% or 90% or more, have substantially the average composition of the starting mixture.

The deformable metals in the mixture are thus subjected to a continual kneading action by virtue of impact compression imparted by the grinding elements, during which individual metal components making up the starting powder mixture become comminuted and fragments thereof are intimately united together and become mutually interdispersed to form composite metal particles having substantially the average composition of the starting mixture. As the particles begin to work harden, they become more susceptible to attrition so that there is a concomitant building up and breaking down of the particles and a consequent improvement of dispersion. The comminuted fragments kneaded into the resulting host metal particle will generally have a dimension substantially less than that of the original metal powders. Refractory hard particles can be easily dispersed in the resulting particle at interparticle spacings of less than one micron, despite the fact that the starting powder might have been larger in size, e.g., 5, 10 or more microns.

The product powders produced in accordance with the invention have the advantage of being non-pyrophoric, i.e., of not being subject to spontaneous combustion when exposed to air. Indeed, the product powders are sufficiently large to resist substantial surface contamination when exposed to air. Thus, in general, at least about 75% of the product particles will be 10 microns or 20 microns or greater in average particle diameter. The particles generally range in shape from substantially equiaxed to thick flaky particles having an irregular outline and an average low surface area per unit weight, i.e., a surface area not greater than about 6000 square centimeters per cubic centimeter of powder. Because the constituents are intimately and densely united together, there is very little, if any, internal porosity within the individual product particles. The product particles may have a size up to about 500 microns with a particle size range of about 20 to about 200 microns being more common when the initial mixture contains a major proportion of an easily deformable metal, such as an iron group metal, copper and similar deformable metals. The relatively large particle size and low surface area which characterize the composite particles is an outstanding advantage in powder metallurgy processes requiring vacuum degassing for removing adsorbed or absorbed gases. The significance of this advantage becomes particularly marked when it is considered that certain fine metal particles absorb as much as 10 times the volume of gas present in the interstitial spaces between the powder particles. Individual phases present in the product particle as comminuted fragments derived from constituent particles present in the initial powder mixture retain their original chemical identity in the mechanically alloyed product powder. The individual starting constituents can be identified by standard analytic means including, for example, X-ray diffraction, the electron probe analyzer, etc. The integrity of the mechanically alloyed product particles is such that the hardness thereof can usually be determined on the particles through the use of a standard diamond indenter employed in usual microhardness testing techniques. In contrast thereto, powder particles loosely sintered or agglomerated together by conventional techniques will usually collapse or fragment under the influence of a diamond indenter. The composite product powder produced in accordance with the invention, on the other hand, is characterized by a dense, cohesive internal structure in which the starting constituents are intimately united together, but still identifiable.

Referring again to the reference mixture of carbonyl nickel powder mixed with about 2.5 volume percent of thoria (less than 0.1 micron) in an attritor mill, tests have shown that substantial interdispersion and particle growth is achieved when a composite metal particle is produced exhibiting an increase in cold worked hardness of at least about 50% of the difference between the ultimate saturation hardness of the product particle and the base hardness of the composition as determined by extrapolating hardness data to zero grinding time. More preferably, it has been found advantageous that the microhardness of the composite metal powder be at least about 75% of the difference between the ultimate saturation hardness and the extrapolated hardness.

Referring to FIG. 3, two curves are shown relating Vickers microhardness to time of milling as determined for two types of grinding mills. Both hardness curves A and B were obtained by dry milling a charge of carbonyl nickel powder having an average Fisher subsieve size of 3 to 5 microns mixed with thoria having a particle size of less than 0.1 micron, except that curve A was obtained by milling the mixture at an 18 to 1 volume ratio of balls-to-powder charge in a high energy stirred ball mill attritor of the type shown in FIG. 2, while curve B was obtained by milling the same mixture, with the same ball-to-charge ratio, in a lower energy ball mill. Referring to curve A, it will be noted that a saturation hardness of approximately 650 Vickers is achieved after about 16 hours of dry milling in the high energy stirred ball mill attritor; whereas, with respect to curve B (a lower energy ball mill with an 18 to 1 ball-to-charge ratio), approximately the same saturation hardness of about 650 Vickers is achieved after about 190 hours of dry milling. It will be noted that both curves extrapolate to a base hardness at zero time of above about 300 Vickers. It will be further noted from the two curves that about one-half of the hardness increase is achieved in the case of the high energy mill (curve A) in about 8 hours, and in the case of the lower energy mill (curve B) in about 100 hours, 75% of the hardness increase being achieved in the mills in about 10 hours and 140 hours, respectively. As stated hereinbefore, the requirement of high energy milling as applied to the foregoing nickel-thoria system as a reference, as met when a wrought composite metal powder of the system can be produced in about 100 hours and, more advantageously, within about 24 hours, having a hardness increase of at least about 50% of substantially the maximum hardness increase capable of being achieved by dry milling for that reference system. In the ball mill run with a ball-to-powder ratio of 18 to 1, the data are given on the basis of loose powder found in the mill at the end of the run.

While the saturation hardness in curve A remains substantially constant from about 16 to over 160 hours, further changes may take place in the composite metal powder during milling beyond 24 hours which in many cases are beneficial. For example, after saturation or maximum hardness is reached and, likewise, the maximum particle size, further grinding begins to reduce the average size of the composite metal particle, during which the internal structure of the composite metal particles improves in homogeneity in that the intimately united constituents tend to be finer and more closely spaced.

When the initial metal particles have melting points of at least 600° K. and, more preferably, at least 1000° K., substantial cold working of the resulting composite or cold welded particles is found to result from the reduction in thickness. This cold working effect promotes fracture and/or comminution of the cold welded particles by action of the milling media. Thus, particles of larger size in the initial mixtures are comminuted or reduced in size. Cold welding of particles, both of original particles and cold welded particles occurs with accumulation of material on the particles being milled. This latter factor contributes to desired particle growth and the overall comminution and/or fracture of cold welded particles contributes to size reduction of the particles. As the dry milling proceeds, the average particle size of the milled particles tends to become substantially stabilized with a decrease in both the amount of subsize particles and the amount of oversize particles and with continued refinement of the internal structure of individual milled particles. Individual components of the powder mixture being milled become comminuted and fragments thereof become intimately united together and dispersed through the matrix of the product powder. The net result of the complex milling process is a destruction of the original identity of the metal powders being milled and the creation of new composite product powders; however, the original constituents are still identifiable. The product powder particles comprise comminuted fragments of the initial metal powders welded or metallurgically bonded together, with the dimension across the comminuted fragments being usually less than one-fifth or preferably less than one-tenth the average diameter of the initial metal powder from which the fragment was derived, e.g., less than 10 microns or less than 5 microns or even less than 1 micron, e.g., 0.01 or 0.02 or 0.05 to 1 micron. Refractory particles included in the initial powder mixture become mechanically entrapped in and distributed throughout the individual product powder particles in a fine state of dispersion approximately equal to the minimum dimension of the aforementioned fragments. Thus, the refractory particle interparticle distance is much less than the particle diameter of the initial metal powder and can be less than 1 micron, in which case there are essentially no dispersoid-free islands or areas.

Again, with reference to powder mixtures having metallic components melting over 600° K. or higher, and preferably at 1000° K. or higher, it is found that the hardness increase during milling apparently substantially exceeds that obtained in the same metal cold worked by other means, e.g., by rolling, forging, and the like, to reduce the thickness 90% without intermediate annealing. Thus, a pellet of carbonyl nickel cold reduced 90% by compression with grinding of cracked edges between reduction stages was found to have a hardness of about 250 Vickers whereas carbonyl nickel powder at about 5 micron size dry milled in an attritor mill, i.e., a stirred ball mill of a one gallon size with a charge of carbonyl nickel pellets about ¼ inch in diameter and an impeller speed of 176 r.p.m. and a ball-to-powder ratio of 18 to 1 exhibited a saturation hardness of 475 Vickers as determined after 24 hours milling time. The Vickers hardness readings obtained on powders as described herein represent the average of 10 reliable readings obtained on dense particles mounted in a standard microspecimen mounting plastic and polished flat.

It is to be appreciated that the saturation hardness for each system dry milled in accordance with the invention will be a characteristic thereof and is dependent upon composition. Systems containing refractory particles have substantially higher saturation hardnesses than the same system devoid of, or substantially devoid of, such particles. For example, the saturation hardness of a nickel-2.5 volume percent thoria system was determined to be about 640 to 650 Vickers hardness as against a Vickers hardness of about 475 for the same nickel without thoria.

A applied to a dispersion-hardened system comprising carbonyl nickel powder mixed with 2.5 volume percent of fine thoria, dry milled in the attritor mill using an 18 to 1 ball-to-powder ratio, the cold working effect has been traced by means of X-ray line broadening (CuK$\alpha$ radiation) in which the width of the 111 peak for nickel was measured at one-half the height. Saturation was observed after 20 hours milling time at a $\beta$ value (° $2\theta$) of about 0.5 determined from the formula $\beta=\sqrt{B^2-b^2}$ wherein B is the peak width at half height for the nickel-thoria system and $b$ is the peak width at half height for the same nickel powder unprocessed and without thoria. The foregoing technique may be advantageously employed in tracing the mechanical alloying effect of dry milling on such systems as nickel-chromium, nickel-copper, iron-copper, lead-copper, and the like.

It is important that the milling process be conducted in the dry state and that liquids be excluded from the milling environment since they tend to prevent cold welding and particle growth of metal powder. The presence of liquid ingredients in the powder mixture being milled, e.g., water or organic liquids such as methyl alcohol, liquid hydrocarbons, or other liquids, with or without surface active agents such as stearic acid, palmitic acid, oleic acid, aluminum nitrate, etc., effectively inhibits welding and particle growth, promotes comminution of the metal constituents of the mix and inhibits production of composite particles. Moreover, wet grinding tends to promote the formation of flakes which should be avoided. The fine comminuted metal ingredients also tend to react with the liquid, e.g., alcohol, and the greatly increased surface area resulting inhibits extraction of absorbed gas under vacuum. Generally, very fine particles tend to be produced which are susceptible to contamination on standing in air or may even be pyrophoric. A virtue of dry milling is that in many cases, air is a suitable gas medium. Alternatively, nitrogen, hydrogen, carbon dioxide, argon and helium and mixtures of these gases can also be employed. When the inert gases argon and helium are employed, care should be taken to eliminate these gases from the product powder mixture prior to final consolidation thereof by powder metallurgy methods. Inert gas media tend to enhance product particle growth and may be of assistance when powder mixtures containing active metals such as aluminum, titanium, etc., are being milled. Preferably, the milling temperature does not exceed about 400° F., e.g., about 150° F., particularly when oxidizable ingredients such as aluminum, titanium, etc., are present in the powder mixture being milled. Generally, the temperature is controlled by providing the mill with a water-cooled jacket such as shown in FIG. 2.

COMPOSITE METAL SYSTEMS

The invention is applicable to the treatment of a wide variety of metal systems having starting particle sizes ranging from about 2 microns to about 500 microns or even up to about 1000 microns. The particles should not be so fine as to be phyrophorically acitive. Coarse particles will tend to break down to smaller sizes during the initial stages of dry milling after which particle growth occurs during formation of the composite metal particle.

As stated hereinbefore, the powder mixture may comprise a plurality of constituents so long as at least one of which is a metal which is compressively deformable. In order to achieve the results of the invention, the ductile metal should, in general, comprise at least about 15% or more by volume of the total powder composition. Where two or more compressively deformable metals are present, it is to be understood that these metals together should comprise at least about 15% by volume of the total powder composition.

The metal systems may range from the well known simple binary alloys to the more complex alloys. The simple alloys may have relatively low melting points, e.g., lead-base, zinc-base, aluminum-base, magnesium-base, or medium melting points, such as copper-base and the like alloys; or relatively high melting points, such as nickel-base, cobalt-base, iron-base, refractory metal-base, and the like alloys, just so long as the compressively deformable metal is at least about 15% by volume of the total composition.

The invention is particularly applicable to those deformable metals having an absolute melting point of over 600° K. and, more preferably, over 1000° K., as such metals are capable of being heavily worked with the milling process. With regard to lower melting metals, which tend to be self-annealing under heavy working conditions at substantially ambient temperature, these can be processed with other metals at ambient temperatures to produce useful wrought composite metal powder. On the other hand, where the need calls for it, such metals can be processed at below their recrystallization temperature by working at substantially below ambient temperatures.

Examples of the more complex alloys that can be produced by the invention include the well known heat resistant alloys, such as alloys based on nickel-chromium, cobalt-chromium, and iron-chromium systems containing one or more of such alloying additions as molybdenum, tungsten, columbium and/or tantalum, aluminum, titanium, zirconium, and the like. The alloying constituents may be added in their elemental form or, to avoid contamination, from atmosphere exposure, as master alloy or metal compound additions wherein the more reactive alloying addition is diluted or compounded with a less reactive metal such as nickel, iron, cobalt, etc. Certain of the alloying non-metals, such as carbon, silicon, boron, and the like, may be employed in the powder form or added as master alloys diluted or compounded with less reactive metals. The master alloy may be prepared under protective conditions such as those provided by vacuum or inert gas melting in proportions to provide a brittle intermetallic compound with the less reactive metal. The compound can then be reduced to powder by conventional crushing and grinding with a concomitant substantial reduction in the reactivity of the reactive elements and with little contamination. Thus, stating it broadly, rather complex alloys, not limited by considerations imposed by the more conventional melting and casting techniques, can be produced in accordance with the invention over a broad spectrum of composition whereby to produce alloys having melting points exceeding 1000° K. based on iron, nickel, cobalt, columbium, tungsten, tantalum, copper, molybdenum, chromium or previous metals of the platinum group.

Alternatively, the simple or more complex alloys can be produced with uniform dispersions of hard phases, such as refractory oxides and refractory carbides, nitrides, borides, and the like. Refractory compounds which may be included in the powder mix include oxides, carbides, nitrides, borides of such refractory metals as thorium, zirconium, hafnium, titanium, and even such refractory oxides of silicon, aluminum, yttrium, cerium, uranium, magnesium, calcium, beryllium and the like. The refractory oxides generally include the oxides of those metals whose negative free energy of formation of the oxide per gram atom of oxygen at about 25° C. is at least about 90,000 calories and whose melting point is at least about 1300° C. The hard phases may range over a broad range to produce cermet compositions so long as sufficient ductile metal is present to provide a host matrix for the hard phase or dispersoid. Where only dispersion strengthening of wrought compositions is desired, such as in high temperature alloys, the amount of dispersoid may range from about 0.5% to 25% by volume and, more advantageously, from about 0.5% to 5% or 10% by volume.

The invention is particularly applicable to the production of high temperature heat resistant alloys falling within the following broad ranges, to wit: alloys containing by weight up to about 65% chromium, e.g., about 5% to 30% chromium, up to about 8% aluminum, e.g., about 0.5% to 6.5% aluminum, up to about 8% titanium, e.g., about 0.5% to 6.5% titanium, up to about 40% molybdenum, up to about 40% tungsten, up to about 20% columbium, up to about 30% tantalum, up to about 40% copper, up to about 2% vanadium, up to about 15% manganese, up to about 2% carbon, up to about 1% silicon, up to about 1% boron, up to about 2% zirconium, up to about 0.5% magnesium and the balance essentially at least one iron group metal (iron, nickel, cobalt) with the sum of the iron group metals being at least 25%, with or without dispersion-strengthening constituents such as thoria, ranging in amounts from about 0.5% to 10% by volume of the total composition.

As stated hereinbefore, the metal systems of limited solubility that can be formulated in accordance with the invention may include lead-copper with the lead ranging, for example, from about 1% to 95% by weight and the balance substantially copper; copper-iron with the copper ranging from about 1% to 95%; copper-tungsten with the copper ranging from about 5% to 98% and the balance substantially tungsten; silver-tungsten with the silver ranging from about 2% to 98% and the balance substantially tungsten; chromium-copper with the chromium ranging from about 5% to 95% and the balance substantially copper, and the like. Where the system of limited solubility is a copper-base or silver-base material, the second element, e.g., tungsten, chromium and the like, may be employed as dispersion strengtheners. Where the elements of limited solubility are substantially compressively deformable in their own right, composite metal particles containing these elements may be produced over a substantially broad range of composition.

In producing mechanically alloyed metal particles from the broad range of materials mentioned hereinbefore, the starting particle size of the starting metals may range from about over 1 micron up to as high as 1000 microns. It is advantageous not to use too fine a particle, particularly where reactive metals are involved. Therefore, it is preferred that the starting particle size of the metals range from about 3 microns up to about 200 microns.

The stable refractory compound particles may, on the other hand, be maintained as fine as possible, for example, below 2 microns and, more advantageously, below 1 micron. A particle size range recognized as being particularly useful in the production of dispersion strengthened systems is 10 angstroms to 1000 angstroms (0.001 to 0.1 micron).

In working with metals which melt above 1000° K., the substantially saturation hardness imparted to the composite metal particle is particularly advantageous in the production of alloys and dispersion strengthened metals and alloys. Observations have indicated that substantially saturation hardness increases effective diffusion coefficients in the product powder. This factor, along with the intimate mixture in the product powder of metal fragments from the initial components to provide small interdiffusion distances, promotes rapid homogenization and alloying of the product powder upon heating to homogenizing temperatures. The foregoing factors are of particular value in the production of powder metallurgy articles having rather complex alloy matrices. The heavily cold worked nature of the product powder generally necessitates a homogenizing or annealing treatment prior to processing into powder metallurgical products. The treatment is conducted at temperatures of at least about 45% of the absolute melting point to homogenize and/or anneal the cold worked powder, or, for example, from about 55% to 80% of the absolute melting point, for a time period of at least about 15 minutes, or from about 30 to about 60 minutes under protective conditions such as that provided by a vacuum, hydrogen, argon, helium, etc. Homogenization and/or annealing can be accomplished, for example, during the heating of canned powders prior to extrusion. Homogenized and/or annealed alloy powders produced in accordance with the invention can be processed in conventional powder metallurgy equipment. In many instances, it may only be necessary in obtaining improved pressability to subject the powder to a heat treatment at a temperature only sufficient to stress relieve or partially soften the major metal constituent of the composite particle without obtaining complete homogenization and without any substantial sintering of the particles. Temperatures on the order of at least 45% of the absolute melting point of the major metal constituent are necessary to achieve this desirable effect.

In the production of mechanically alloyed powders, amounts of oxygen up to about 1% by weight in excess of that added as a refractory oxide dispersoid, preferably not exceeding about 0.75% or about 0.5% oxygen, may be tolerated. One of the advantages of formulating compositions in accordance with the invention is that very little or no oxidation occurs during high energy milling. However, unlike the kind of oxidation which occurs in conventional melting techniques, the extraneous oxides which occur appear as fine dispersoids and can be useful as dispersion strengtheners, provided they are chemically stable and temperature resistant.

In order to give those skilled in the art a better understanding of the invention, the following illustrative examples are given:

Example I

A charge consisting of 1,173 grams of carbonyl nickel powder having an average Fisher subsieve size of 3 to 5 microns with 27 grams of thoria having a particle size of about 50 angstroms was pre-blended in a high speed food blender (Waring blender) and was then dry milled in air for 24 hours in a stirred vertically upstanding, water-jacketed attritor mill of the type illustrated schematically in FIG. 2. The mill contained a one gallon volume of carbonyl nickel shot or balls of average diameter of about one-quarter inch and operated at an impeller speed of about 176 r.p.m. The volume ratio of the ball to the powder charge was 18 to 1. Upon completion of the milling, the powder was separated from the attritive elements and occasional coarse particles removed from the powder. The powder which had a saturation hardness of about 640 to 650 Vickers was placed in a mild steel extrusion can and evacuated to a pressure of less than 0.1 micron of mercury at 400° C. The can was then sealed, heated to 1800° F. and extruded at an extrusion ratio of 16 to 1. The extruded product contained a fine, stable dispersion of thoria. Light microscopy and electron microscopic examination of surface replicas revealed that the metal grains in the metal were less than 5 microns in size with the bulk of the grains being less than 1 micron and that the thoria particle size was less than 0.2 micron with most of the thoria being about 200 angstroms. The structure of a particle of the thoriated nickel powder in the as-milled condition was similar to that depicted in FIG. 4 of the drawing.

The properties of the material in the as-extruded condition and after various amounts of cold swaging are given in the following Table I:

TABLE I

| Test temperature, °F. | Hot ultimate tensile strength (p.s.i.) as extruded and after cold swaging (percent R.A.) | | | |
|---|---|---|---|---|
| | As-extruded | 40% | 61% | 75% |
| 1,400 | 18,700 | | | 37,300 |
| 1,800 | 10,500 | 16,300 | 21,900 | 26,300 |
| 2,000 | 7,500 | | | 20,900 |

NOTE.—P.s.i.=pounds per square inch. R.A.=reduction in area.

In contradistinction to the foregoing, a charge consisting of 977.5 grams carbonyl nickel powder having an average Fisher subsieve size of 3 to 5 microns with 22.5 grams of thoria having a particle size of about 50 angstroms was dry milled in air for six hours in the same mill as in Example I using a running speed of 146 r.p.m. Four batches were prepared in the same manner at a ball-to-powder weight ratio of 22 to 1 and 2,000 grams of the product accumulated from which occasional coarse particles were removed. The powder was similarly hot extruded under the same conditions as in Example I. The extruded product contained a fine, stable dispersion of thoria. Light microscopy and electron microscopic examination of surface replicas revealed that the metal grains in the metal were less than 10 microns in size and that the thoria particle was less than 0.2 micron. The structure of a particle of the thoriated nickel powder in the as-milled condition is depicted in FIG. 4 of the drawing. The average particle size of the milled powder was less than 74 microns. A portion of the powder depicted in FIG. 4 was annealed in argon for 16 hours and the structure of an annealed particle is depicted in FIG. 5, wherein the fine grained areas are those in which a good thoria distribution was achieved in the six hour milling time. In these areas the grain sizes are less than 1 micron. In areas wherein poor distribution of thoria was obtained due to the short milling time and low milling speed, the grain size is on the order of 10 microns. The dark spots and lines are holes associated with carbon and oxygen impurities in the starting material. A portion of the as-extruded material was cold worked 22% by bar rolling and the properties of the as-extruded and cold worked material were determined by the short-time tensile test at various temperatures with the results set forth in the following Table II:

TABLE II

| Test temp., F. | Condition | Yield strength 0.2% offset k.s.i. | Tensile strength, k.s.i. | El., percent | R.A., percent |
|---|---|---|---|---|---|
| Room | As extruded | 92.9 | 110.5 | 19.0 | 60.5 |
| 1,400 | do | 14.1 | 14.1 | 14.0 | 38.5 |
| 1,400 | Cold worked | 16.7 | 17.6 | 15.5 | 29.0 |
| 1,800 | As extruded | 5.4 | 8.7 | 10.9 | 11.6 |
| 1,800 | Cold worked | 7.3 | 13.6 | 7.2 | 11.2 |
| 2,000 | As extruded | 4.8 | 6.9 | 9.0 | 16.0 |

NOTE.—k.s.i.=thousands of pounds per square inch. El.=elongation.

The structure of the as-extruded material is depicted in FIG. 6 of the drawing. It is to be seen that small thoria-free areas are presently attributable to the relatively short milling time and low milling speed employed. The internal structure of the material of Example I was, on the other hand, more uniform in view of the longer milling time. Nevertheless, the properties of the material at elevated temperatures were markedly improved over those of pure nickel.

As a further comparison, the procedure of Example I was repeated using a 2,200 gram batch of powder with a milling time of 24 hours in air in the same attritor mill running at a speed of 184 r.p.m. The ball-to-powder volume ratio in this instance was about 10 to 1. Material from this batch was hot extruded and the structure of the as-extruded material is depicted in FIG. 7 taken at 750 diameters. The internal structure of the composite metal particle was similar to that obtained in Example I in that the thoria-free areas which were depicted in FIG. 6 were eliminated. The as-extruded tensile strength of this material at 2000° F. was 7,400 pounds per square inch (p.s.i.). A portion of the as-extruded material was then cold swaged to reduce the cross sectional area thereof 75%. After the cold swaging treatment, the tensile strength of the material at 2000° F. was raised to 15,000 p.s.i. The structure of the as-extruded cold swaged material at 750 diameters is depicted in FIG. 8 of the drawing.

As illustrative of the use of the invention in producing superalloys, the following additional examples are given:

Example II

A nickel-titanium-aluminum master alloy was prepared by vacuum induction melting. The resulting ingot was heated at 2200° F. for 16 hours in air, cooled to room temperature and crushed and ground to minus 325 mesh powder. The powder (Powder A) contained 72.93% nickel, 16.72% titanium, 7.75% aluminum, 1.55% iron, 0.62% copper, 0.033% carbon, 0.050% $Al_2O_3$, and 0.036% $TiO_2$. About 14.9 weight percent of this powder was blended with 62.25% carbonyl nickel powder having a Fisher subsieve size of about 5 to 7 microns, 19.8% chromium powder having a particle size passing 200 mesh and 3.05% of thoria having a particle size of about 400 angstroms. The nickel and thoria were preblended in the Waring Blendor. About 1300 grams of the powder blend were dry milled in the attritor mill described in Example I using one gallon of plus ¼ inch carbonyl nickel pellets or balls, at a ball-to-powder volume ratio of about 17 to 1, and an argon atmosphere for 48 hours with an impeller speed of 176 r.p.m. The striated structure of powder from this batch is shown in FIG. 9 taken at 750 diameters. Two batches of powder were sieved to remove small amounts of abnormally large particles, i.e., plus 45 mesh. Optical microscopic examination of the product powder demonstrated excellent interdispersion of ingredients in composite powder particles. The powder, which analyzed 73.86% nickel, 19.3% chromium, 2.16% titanium, 1.19% aluminum, 0.017% carbon, less than 0.05% copper, 2.93% thoria, also contained only 0.015% $Al_2O_3$ and 0.013% $TiO_2$ and other negligible impurities, showing that the content of extraneous oxides was very low. About 2,040 grams of minus 45 mesh, plus 325 mesh powder were placed in a stainless steel extrusion can, evacuated to a pressure of $2 \times 10^{-5}$ millimeters of mercury at 350° C. and sealed. The assembly was heated to 2150° F. and extruded with an extrusion ratio of 16 to 1. The sound extruded bar was found to respond to precipitation hardening after a solution anneal for 16 hours at 1200° C. and aging for 16 hours at 705° C. The extruded material contained thoria in an intimate state with an interparticle spacing of less than 1 micron and with an average thoria particle size of about 0.04 micron. The solution treatment lowered the hardness from 275 Vickers for the as-extruded product to 235 Vickers. This latter hardness may be compared to a hardness range for a conventionally produced, solution-treated age hardenable, nickel-base, high temperature alloy of about 200 to 250 Vickers having essentially the same matrix composition of the foregoing extruded alloy. Aging the thoria-containing alloy for 16 hours at 705° C. (1300° F.) increased the hardness to 356 Vickers which compares favorably with the hardness range of 290 to 370 Vickers for the comparison alloy, except that the alloy produced in accordance with the invention is further enhanced as to its load-carrying capability at elevated temperatures by virtue of the presence of a uniform dispersion of ultra-fine thoria.

Example III

Another thoriated complex superalloy was also produced in which both gamma prime strengthening and thoria dispersion strengthening were successfully demonstrated, despite the fact that normally the ingredients employed in formulating the composition are quite reactive. A nickel-aluminum-titanium-molybdenum-columbium - zirconium-carbon-boron master alloy was prepared by vacuum induction melting. The resulting ingot was heated to 220° F. for 16 hours in air, crushed and ground to minus 325 mesh powder. The powder (Powder B) contained 67.69% nickel, 8.95% molybdenum, 5.70% columbium, 15.44% aluminum, 1.77% titanium, 0.053% carbon, 0.06% zirconium, and 0.01% boron. About 39.5 weight percent of this powder was blended with 45.74% carbonyl nickel powder having a Fisher subsieve size of about 5 microns, 11.64% chromium powder having a particle size passing 200 mesh and 3.12% of thoria having a particle size of about 400 angstroms. The nickel and thoria were preblended in the Waring blender. About 750 grams of the powder blend were dry milled in the attritor mill described in Example I at a ball-to-powder volume ratio of about 29 to 1 using one gallon of plus ¼ inch carbonyl nickel pellets or balls, for 48 hours in air with an impeller speed of 176 r.p.m. Three batches of powder were produced. The bulk of the powder which passed through a 45 mesh screen was retained. Microscopic examination of the powder revealed that the constituents had intimately united together and showed excellent interdispersion of ingredients in composite metal powder particles.

A charge of 1,970 grams of this powder was placed in a stainless steel extrusion can which was evacuated to a pressure of $10^{-5}$ millimeters of mercury at 425° C. and sealed. The assembly was heated to about 1200° C. and extruded with an extrusion ratio of 16 to 1.

The composition of the resulting consolidated bar is given in the following Table III:

TABLE III

| Element: | Weight percent |
|---|---|
| Carbon | 0.07 |
| Chromium | 10.40 |
| Molybdenum | 3.00 |
| Columbium | 1.60 |
| Aluminum (Total) | 5.20 |
| Titanium | 0.65 |
| Boron | 0.007 |
| Zirconium | 0.03 |
| $ThO_2$ | 3.20 |
| $Al_2O_3$ | 1.38 |
| $TiO_2$ | 0.018 |
| $Cr_2O_3$ | 0.016 |
| Nickel | Balance |

Portions of extruded bar from this alloy were heated to 1240° C. for 4 hours in argon to solution treat, increase the grain size and complete homogenization of the structure. The alloy was furance cooled to allow precipitation hardening. The grain structure of a longitudinal section of the heat treated alloy is shown in FIG. 10 taken at 100 diameters. It will be noted that the grain structure is elongated in the extrusion direction.

Figure 11:
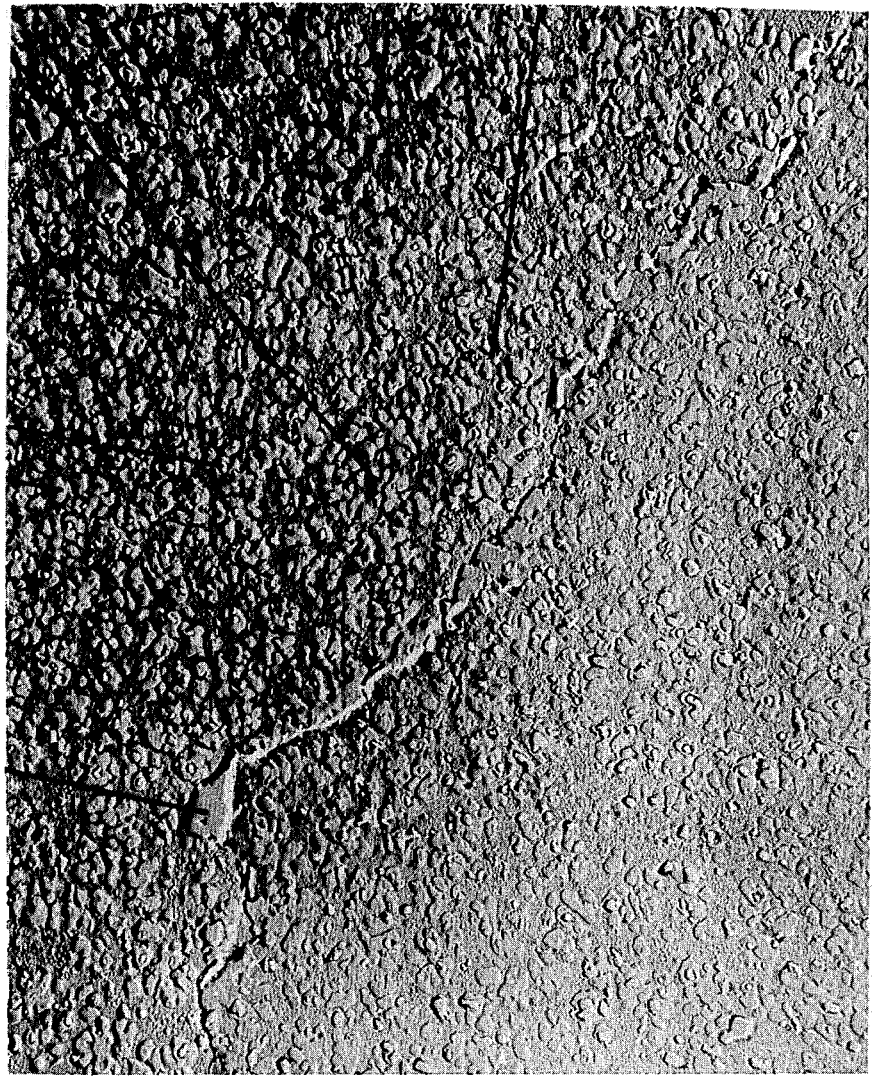
FIG. 11 is a reproduction of an electron photomicrograph taken at 10,000 diameters of a surface replica of the thoriated complex superalloy shown in FIG. 10.
Figure 18:
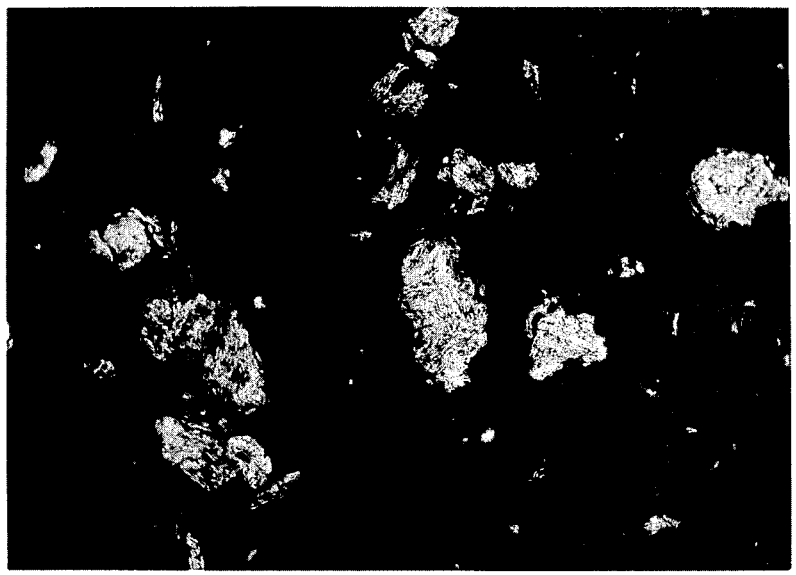
FIG. 18 is a reproduction of a photomicrograph taken at 100 diameters of wrought composite metal particles of iron-copper similar to FIG. 16 except that the milling time is three times that employed in producing the particles illustrated in FIG. 16.
Figure 19:
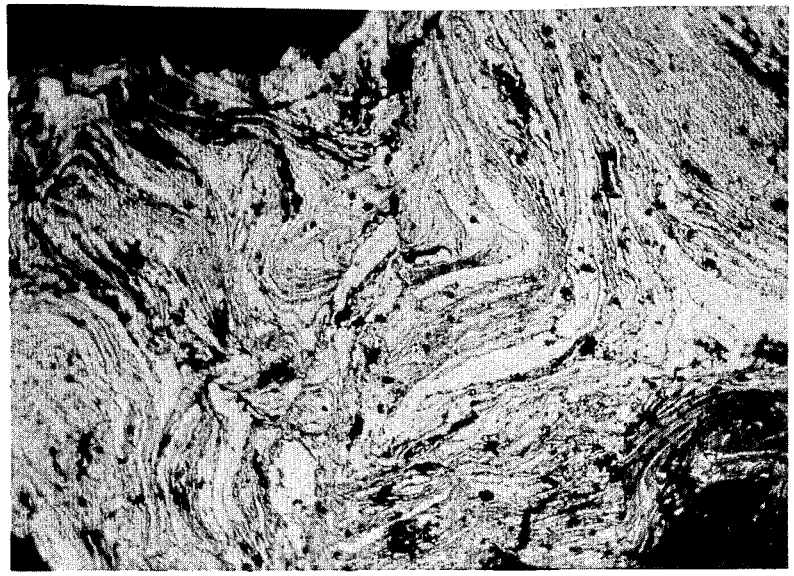
FIG. 19 is a reproduction of a photomicrograph taken at 750 diameters of the same material shown in FIG. 18.

The fine structure of this alloy is shown in FIG. 11 taken at 10,000 diameters. The features to be noted in this photograph are: A–A', an irregular grain boundary; B, and MC carbide; C, a coarse gamma prime particle precipitated at high temperature; D, fine gamma prime precipitated at lower temperatures; E, and $M_{23}C_6$ carbide particle within a coarse gamma prime particle; and F, ultrafine $ThO_2$ particles within a coarse gamma prime particle, The alloy accordingly contains both a gamma prime precipitation hardening phase and an intimate dispersion of thoria with an interparticle spacing of less than one micron and an average thoria particle size of about 0.05 micron (500 angstroms).

The short-time elevated temperature tensile properties of the material after the aforementioned heat treatment are given in the following Table IV:

TABLE IV

| Test temp., °F. | Yield strength 0.2% offset, p.s.i. | Tensile strength, p.s.i. | Elongation, percent | R.A., percent |
|---|---|---|---|---|
| 1,400 | 99,000 | 112,400 | 7.5 | 10.0 |
| 1,800 | 27,400 | 35,400 | 11.0 | 8.0 |
| 2,000 | 10,700 | 11,700 | 9.0 | 24.5 |

The elevated temperature ultimate tensile strengths (p.s.i.) of the thoriated complex superalloy and of the nickel-thoria alloy of Example I are compared in the following Table V:

TABLE V

| Test temp., °F. | As-extruded, heat treated thoriated complex superalloy of this example | Thoriated nickel of Example I as-extruded |
|---|---|---|
| 1,400 | 112,400 | 18,700 |
| 1,800 | 35,400 | 10,500 |
| 2,000 | 11,700 | 7,500 |

The advantage of gamma prime strengthening in raising the strength, especially at intermediate temperatures such as 1400° F., is apparent.

This confirms that the advantage of both gamma prime precipitation hardening and thoria dispersion strengthening can be achieved in one alloy using the unique high energy dry milling technique provided by the invention.

For optimum results, it is desirable that the individual composite metal particles possess a striated or lineated structure having a spacing as small as possible, for example, less than about one micron or even below 0.1 micron. However, the spacing may range up to about 10 microns. The smaller distances are preferred as less diffusion time is required when homogenizing the particles at an elevated homogenizing temperature. Striation spacing is a function of dry milling time as will be observed by referring to FIGS. 12 to 15 which illustrate the structures obtained as a function of dry milling time with a thoriated nickel-chromium-aluminum-titanium age hardenable alloy of the composition 19.9% chromium, 1.13% aluminum, 2.28% titanium, 3.06% thorium oxide and the balance essentially nickel. The starting powders were 5 micron carbonyl nickel, minus 74 micron chromium, minus 44 micron nickel-aluminum titanium master alloy and 500 angstroms thorium oxide.

The composite metal particles obtained after 16 hours of dry milling in the attritor containing one gallon of approximately ¼ inch nickel pellets or balls at a ball-to-powder volume ratio of about 17 to 1 are shown in FIG. 12 taken at 100 times diameter. The particles which have an average size of about 150 to 200 microns after 16 hours of dry milling show the constituents intimately united and substantially mutually interdispersed. In FIG. 13, which depicts the structure within a single particle of the kind shown in FIG. 12 and was taken at 1,000 diameters magnification, the various constituents are identifiable, particularly the chromium and the master alloy internally interdispersed with the nickel and intimately united by cold welding to form a mechanically alloyed structure. The structure is roughly striated and exhibits spacing distances between constituents ranging roughly from about 5 to 10 microns. However, such particles have utility in that substantial homogenization can be obtained at elevated temperatures by allowing sufficient time for diffusion. However, a more uniform codissemination or interdispersion is obtained after a dry milling time of 48 hours as shown in FIGS. 14 (100 diameters) and 15 (1,000 diameters). Particular attention is directed to the microstructure of the single particle shown in FIG. 15 in which the chromium is so well dispersed within the nickel matrix that it appears to have merged with the nickel. This is remarkable considering that the composite metal particle with the mechanically alloyed internal structure was produced from a plurality of constituents by cold welding and particle growth and not by the application of heat as is normally employed in producing such dense microstructures. The spacing between striations is remarkably lower and of the order of about one micron or less. This is very desirable as it provides a composite metal particle capable of being easily homogenized by diffusion heat treatment. The particle size of the powder is noted to range roughly from about 150 to 200 microns after both 16 hours and 48 hours of milling, the main difference being that the particles of the 48-hour powder has markedly improved internal homogeneity. The microhardness of the two powders were substantially of the same magnitude, the 16-hour powder achieving a Vickers saturation hardness of about 806 and the 48-hour powder a hardness of about 796 Vickers.

As illustrative of other alloys that can be produced by the invention, the following further examples are given:

Example IV

In producing a stainless steel composition, the following starting materials were employed: (a) low carbon ferrochrome of about minus 200 plus 325 mesh containing 70% chromium, 1.01% silicon, 1.35% $SiO_2$, 0.54% $Cr_2O_3$ and the balance essentially iron; (b) high purity sponge iron of minus 100 mesh; and (c) carbonyl nickel powder of about 3 to 5 microns average size. A 900 gram batch was placed in the attritor mill of Example I comprising 10% by weight of the carbonyl nickel powder, 27.2% by weight of the low carbon ferrochrome and 62.8% of the sponge iron. Two batches were dry milled (16 hours and 48 hours) using a one gallon volume of nickel pellets or balls of about ¼ inch in size at a ball-to-powder volume ratio of about 24 to 1.

Both powder products had a final average particle size of about 125 to 135 microns, the 48-hour powder having a much finer and more homogeneous microstructure. The 16-hour powder exhibited an as-milled hardness of 785 Vickers which dropped to 381 Vickers after being heated at 1800° F. for about one-half hour and to 324 Vickers, following heating at 1950° F. for about one-half hour. The 48-hour powder, on the other hand, exhibited much higher hardness retention, the as-milled hardness being 794 Vickers, which dropped to only 523 Vickers after heating for about one-half hour at 1800° F. and to 409 Vickers after a one-half hour anneal at 1950° F. After the 1950° F. heating, the internal structure of the composite metal particle is homogeneous. It is found that a one-hour anneal at about 2200° F. yields a hardness of about 200 to 220 Vickers. A commercial atomized stainless steel composition has an as-received hardness of about 233 Vickers, thus illustrating the high hardness of the stainless steel powder provided in accordance with the invention. The compositions of the steel tested are as follows:

| Designation | Percent | | | | | | |
|---|---|---|---|---|---|---|---|
| | Fe | Ni | Cr | Si | $SiO_2$ | $Cr_2O_3$ | C |
| 16-hour | Bal. | 15.5 | 16.9 | 0.21 | 0.80 | 0.17 | 0.05 |
| 48-hour | Bal. | 15.1 | 17.6 | 0.26 | 0.88 | 0.17 | 0.037 |

The 16-hour sample was annealed at 1950° F. for one-half hour (minus 80 mesh), pressed into a compact at 40 tons per square inch to a density of about 74% of true density to provide a green strength of 1,085 p.s.i.

Another stainless steel composition was produced by dry milling a mix containing 84 grams of carbonyl nickel powder having an average particle size of 3 to 5 microns, 341 grams of high purity ferrochrome powder containing about 0.1% silica and about 70% chromium of about 120 microns average particle size, and 763 grams of high purity sponge iron powder (0.032% carbon, 0.115% silica) of minus 100 mesh particle size. Two such batches were dry milled well beyond the point of saturation hardness for 40 hours in the attritor mill described in Example I with an impeller speed of 176 r.p.m. in air at a ball-to-powder volume ratio of about 18 to 1. The resulting dry milled powder product which was very low in combined oxygen and had an average particle size of about 85 microns was vacuum sealed by welding in a mild steel can and was then heated for about one and one-half hours to about 1900° F. and was extruded to rod at an extrusion ratio of about 12.5 to 1. The extruded material analyzed, by weight, in addition to iron, 9% nickel, 20% soluble chromium, and 0.09% silicon. No silica was detectable in the extruded metal but 2.15%, by weight, of chromium oxide was found therein by chemical analysis. Micrographic examination of the extruded material revealed that a finely divided grayish dispersoid, believed to be chromium oxide, was contained therein in a uniformly distributed state. It was concluded that the source of chromium oxide was atmospheric air intruding into the extrusion can. Tensile and stress-rupture specimens were machined from the extruded rod. At room temperature, the material exhibited a tensile strength of 195,500 p.s.i., a yield strength (0.2% offset) of 172,300 p.s.i., an elongation of 7.5%, a reduction in area of 29% and a modulus of elasticity of $26.7 \times 10^6$ p.s.i. The material had a Vickers hardness of 421 and was very slightly ferromagnetic. A life of 44.9 hours with 2.5% elongation was obtained by a stress rupture test at 1200° F. and 35,000 p.s.i. load while after over 70 hours the material was still unbroken in a test at 1500° F. and 10,000 p.s.i. load. After a 90 hour anneal at 2000° F. the material was nonmagnetic and had a Vickers hardness of 390. The properties clearly demonstrated this material was dispersion strengthened.

Example V

In producing a composite metal powder of iron-copper containing about 80% iron and 20% copper, the following starting materials were employed: (a) hydrogen reduced copper of minus 325 mesh and sponge iron of minus 100 mesh (approximately 65 microns). The dry milling was carried out in air in a laboratory sized (50 cubic centimeters) high speed shaker mill operated at about 1,200 cycles per minute. This type of high energy mill enables the production of composite metal particles in a very short period of time compared to the attritor mill of Example I. Ten grams of powder were mixed with about 45 grams of one-quarter inch nickel pellets or balls to provide a ball-to-powder volume ratio of about 4.5 to 1. The ratio of dynamic interstitial volume to powder volume was 41 to 1 in this device. Two batches were run, one for a period of 10 minutes and the other at three times the period or 30 minutes. The results obtained are illustrated in FIGS. 16 to 19, FIGS. 16 and 17 depicting the 10-minute powder and FIGS. 18 and 19 the 30-minute powder.

Referring to FIG. 16, which is a photomicrograph taken at 100 diameters magnification, it will be noted that a rather striated structure is obtained, which appears quite coarse in FIG. 17 (750 times diameter). The average particle size was in the neighborhood of about 115 microns, the internal spacing between striations ranging broadly from about 5 to 20 microns. The Vickers microhardness of this powder was about 241.

On the other hand, when the powder was milled for 30 minutes (FIGS. 18 and 19), the hardness rose to 353 Vickers and the average particle size to 135 microns. As will be noted from FIG. 19, the striated structure is much more uniform, with average spacings between phases of up to about 1 micron. It was noted that the 10-minute powder had a coppery appearance. However, after 30 minutes of milling, it took on a steel-gray color, thus indicating that the 30-minute powder was much more homogenous.

Example VI

The limited solubility system of copper-lead containing about 50% by volume of each of the elements was produced using the same high speed shaker mill as in Example V. As starting materials, lead filings and minus 325 mesh hydrogen reduced copper were employed. The ball-to-powder ratio was about 4 to 1. Two batches of powder were dry milled, a 10-minute run and a 30-minute run. The cold work microhardness at 10 minutes was 34.6 Vickers, while after 30 minutes of milling, the hardness doubled to 69.5 Vickers. Referring to FIGS. 20 to 23, it will be noted that the microstructures are slightly different compared to the metal systems of much higher melting points. This may be attributed to the fact that a large amount of lead is present and the fact that lead has a melting point of about 600° K. absolute and is self-annealing when worked at ambient temperatures. Referring to the 10-minute samples of FIG. 20 (100 times diameter) and FIG. 21 (750 times diameter), it will be noted that substantially uniform internal interdispersion of the two elements have been obtained within the particle, except that the dimensions of the comminuted constituents are substantially above 1 micron, for example, 5 microns and over. In contradistinction, the 30-minute powder of FIG. 22 (100 diameters) and FIG. 23 (750 diameters) exhibited a much more uniform interdisperison with much closer spacing of the phases of less than 5 microns and more in the neighborhood of 1 micron and below.

Example VII

As indicated hereinbefore, one of the advantages of the method provided by the invention is that high carbon-containing alloys, such as tool steels, may be produced while avoiding the problem of forming carbide dendrites of segregates which normally attend such alloys when produced by conventional melting and casting techniques. An example of one composition is the rather complex high speed tool steel containing 20% tungsten, 12% cobalt, 4% chromium, 2% vanadium, 0.8% carbon and the balance substantially iron. In producing the composition, a mixture of the constituents is placed in a high energy mill as described in Example I containing approximately ¼ inch tungsten carbide balls at a ball-to-powder volume ratio of about 20 to 1. The powder is dry milled at an impeller speed of 180 r.p.m. until composite metal particles are formed which have substantially saturated hardness and the milling continued for a time sufficient to obtain an internal structure within the particles in which the constituents are intimately united and homogeneously interdispersed. The powder is thereafter vacuum sealed in a mild steel can and extruded at a temperature of about 2150° F. at an extrusion ratio of 16 to 1. The steel produced in this way, unlike the conventional produced steel, will be free of carbide dendrites and segregates.

Example VIII

Recently a new type of ultra high strength nickel alloy steel has been developed which is referred to as a maraging steel. This steel is unique in that in the solution annealed state, the microstructure is soft martensite, the steel being hardenable merely by heating it to a relatively low temperature of about 900° F. An example of one such composition is a steel containing about 18.5% nickel, 7.5% cobalt, 4.8% molybdenum, about 0.1% aluminum, about 0.40% titanium, and carbon not exceeding 0.03% maximum. It would be desirable to produce such steels by powder metallurgy. A difficulty is the rather sluggish diffusivity characteristic of molybdenum when a simple powder mixture of the foregoing ingredients is consolidated and hot extruded. This difficulty is obviated by using the method of the invention. A powder mixture of the ingredients passing through 100 mesh is placed in the high energy attritor of Example I using ¼ inch nickel balls at a ball-to-powder weight ratio of about 20 to 1 and the charge is dry milled at an impeller speed of about 180 r.p.m. The powder is milled until substantially saturation hardness is reached and continued until the microstructure of the resulting composite metal powder is substantially homogeneous. The product powder will generally have a particle size such that at least about 75% of the particles exceed 10 microns in size and are non-pyrophoric. Thereafter, the product may be annealed and employed in producing wrought metal parts by using well known powder metallurgy techniques. If desired, a small proportion of hard refractory particles can be introduced in the initial powder mixture, whereby to provide a hot extruded dispersion strengthened product having improved strength properties at a temperature range of 900° F. to 1200° F.

Example IX

The invention may be applied to the production of a refractory carbide structure, such as tungsten carbide tool compositions. An example of a tool composition is one containing about 25% by weight of cobalt and about 75% by weight of tungsten carbide, which on the volume basis corresponds to about 37 volume percent of cobalt and about 63 volume percent of tungsten carbide. A powder mixture of the foregoing composition consisting essentially of about 5 to 7 microns cobalt and about 3 to 5 microns tungsten carbide is placed in the attritor mill of Example I containing ¼ inch tungsten carbide balls and dry milled at a ball-to-powder volume ratio of about 25 to 1 and an impeller speed of 185 r.p.m. until a composite metal powder is obtained characterized by a microstructure in which the constituents are intimately united or mechanically alloyed to provide a homogeneous interdispersion. The composite metal powder is then annealed and then employed in the production of sintered tool shapes in accordance with prevailing practice.

In another instance involving the treatment of very hard powders, a charge consisting of about 50% by volume of 5 micron tungsten powder and about 50% by volume of zirocnium oxide powder having a particle size of 300 angstroms was dry milled in a high speed laboratory shaker mill for about three hours. A composite powder comprising zirconia distributed through a tungsten matrix was produced. This powder was then mixed with carbonyl nickel powder having an average particle size of about 3 to 5 microns in volume proportions of about 40% tungsten-zirconia composite and about 60% nickel. This charge was again dry milled in the high speed shaker mill for a total of two hours. Hard tungsten-zirconia powders were comminuted and distributed in the product powder as a finely dispersed phase. The resulting relatively coarse product powder contained by volume about 20% zirconia, about 20% tungsten and about 60% nickel in hierarchical relation with minimal contact between zirconia and nickel.

Example X

Certain heat resistant alloys containing high amounts of aluminum are difficult to produce. The present invention is particularly adapted to the production of an iron-base alloy containing about 15% aluminum and the balance substantially iron. The starting mixture may comprise sponge iron of about 65 microns in size and iron-aluminum master alloy powder crushed to minus 200 mesh. The mixture is placed in the attritor mill of Example I containing ¼ inch nickel pellets or balls at a ball-to-powder ratio of about 20 to 1 and the charge is dry milled at an impeller speed of about 175 r.p.m. until a mechanically alloyed metal powder is obtained characterized metallographically by a microstructure comprising a substantially homogeneous interdispersion of the ingredients. The powder may thereafter be annealed and employed in the hot extrusion of various shapes.

An illustration of producing a nickel alloy dispersion strengthened with alumina in accordance with the above technique, is given in the following example:

Example XI

A charge of about 1,000 grams is prepared by mixing 781 grams of carbonyl nickel powder of about 3 to 5 microns in size with 44 grams of nickel oxide (NiO) of less than 44 microns in size and 75 grams of an 80 weight percent nickel-20 weight percent aluminum master alloy powder also less than 44 microns in size. The nickel oxide is to provide oxygen for oxidizing the aluminum to $Al_2O_3$, the amount of nickel oxide being calculated to produce about 20 grams of $Al_2O_3$ by oxidizing 10.6 grams of aluminum to leave an excess of aluminum, about 4.4 grams, to be absorbed by the nickel matrix. The mixture is placed in the attritor mill of Example I containing an amount of one-quarter inch nickel balls to provide a ball-to-charge volume ratio of about 22 to 1. The charge is dry milled for about 48 hours at an impeller speed of 176 r.p.m., following which the charge is separated from the balls and occasional coarse particles removed from the milled mixture. The milled powder is sealed in a mild steel can as in Example I and the canned contents heated to 1800° F. and hot extruded at an extrusion ratio of 16 to 1. It is found from the improved elevated temperature properties of the alloy that the constituents in the composite metal particles have diffused into each other and that the oxygen of the nickel oxide has reacted with the aluminum to convert a stoichiometric portion of it to $Al_2O_3$. This may then be followed, if desired, by cold swaging to further enhance the strength properties of the alloy.

The method described in the foregoing example is applicable to a wide range of dispersion strengtheners so long as the metal to be oxidized is capable of forming a stable refractory oxide. Examples of oxidizable metals are chromium, silicon, aluminum, titanium, uranium, magnesium, calcium, beryllium, rare earth metals, yttrium, thorium, and the like. Generally speaking, the refractory oxide-forming metals are those which exhibit a free energy of formation of the oxide of at least about 90,000, and preferably, at least about 120,000, calories per gram atom of oxygen at about 25° C.

Metal oxides which may be employed for oxidizing the foregoing refractory oxide-forming metals are those whose free energy of formation of the oxide at about 25° C. does not exceed about 75,000 calories per gram atom of oxygen. Examples of such oxides are NiO, CuO, CoO, $Fe_2O_3$, $Ag_2O$, and the like metal oxides. It is of course to be appreciated that the effective agent in carrying out such an oxidizing process is oxygen. As an example of a method whereby oxygen contained, per se, in mechanically alloyed metal powder was utilized to produce a dispersion strengthened nickel-base alloy, the following is given:

Example XII

A master alloy powder was prepared by vacuum melting and grinding to pass through a 200 mesh screen. Chemical analysis showed this master alloy to contain 7.1% aluminum, 14.15% titanium, 8.97% cerium-free misch metal, .43% iron, .18% oxygen and .07% carbon, balance nickel. Fifteen hundred and forty-seven grams of this master alloy were combined with 1800 grams of chromium powder containing .342% oxygen and passing 200 mesh, 20.4 grams of a nickel 28% zirconium master alloy powder passing 200 mesh, 3.87 grams of a nickel-17% boron master alloy powder passing 200 mesh, and 5441.5 grams of carbonyl nickel powder of 4–7 microns particle size containing .085% oxygen. This mixture of powders was processed for 40 hours in an attritor mill containing 420 pounds of +¼" nickel pellets operating at 132 r.p.m. The attritor tank was sealed during the processing to prevent the entrance of any oxygen other than that added with the powders and that present in the atmosphere initially in the attritor tank. This mix was calculated to contain 1.28% aluminum, 2.1% titanium, 20.8% chromium, 0.07% zirconium, 0.007% boron, 1.61% cerium-free misch metal, 0.15% by weight oxygen with the balance essentially nickel. The 139 grams of cerium free misch metal added with a master alloy would require 20.5 grams of oxygen to be converted to oxide (didymium oxide $Di_2O_3$). The metallic powders provide only 13.45 grams of oxygen. There is also 10 gallons of air within the attritor, which provides an additional 10.8 grams of oxygen for reaction with the reactive cerium-free misch metal component. This oxygen is adsorbed on fresh metal surfaces created during the mechanical alloying processing.

Following completion of the processing, the powder was screened to remove occasional coarse particles and packed and sealed in 3½"-diameter mild steel container. This container was extruded at 1950° F. to ¾" bar. Following this the bar was heat treated for 2 hours at 2325° F. followed by 7 hours at 1975° F. and 16 hours at 1300° F. The results of stress rupture tests performed on this bar are shown in Table VI and clearly indicate that conversion of the cerium-free misch metal to didymium oxide ($Di_2O_3$) had occurred by reaction with the mechanically alloyed oxygen originating with the raw materials and the milling atmosphere.

TABLE VI

| Test temp. (° F.) | Stress (p.s.i.) | Life (hrs.) | Percent El. | Percent R.A. |
|---|---|---|---|---|
| 1,900 | 18,000 | 1.5 | 8.0 | 11.6 |
| 1,900 | 16,000 | 69.6 | 4.4 | 4.0 |
| 1,900 | 16,000 | 472.7 | 4.0 | 6.0 |
| 1,400 | 50,000 | 16.3 | 2.7 | 3.9 |
| 1,400 | 40,000 | 193.1 | 4.4 | 7.0 |

The 1900° F. stress rupture properties demonstrate the high level of strength typical of dispersion strengthened materials, while the results of the stress rupture tests at 1400° F. clearly demonstrate the additional presence of precipitation hardening effects at low to intermediate temperatures.

Because the mixing occurs in effect by mechanically alloying the constituents together within separate particles, interparticle spacing between constituents is fixed and predetermined leading to vastly improved and rapid homogenization by means of short-time diffusion annealing treatments. Moreover, since the particles are heavily cold worked, they can be easily stress relieved at temperatures below those used for diffusion annealing resulting in improved pressability of the powder. In addition, reactive components, e.g., aluminum, titanium and the like are in effect neutralized by the milling technique by being incorporated into and being protected by the matrix of the host metal, e.g., nickel, making up the major constituent of the composite metal particle.

No matter how coarse the product powder produced in accordance with the invention, the dissemination of the constituents in the particle is extremely intimate and fine. The advantage of providing a coarse composite metal powder is that it can be stored with minimum contamination, is capable of being easily outgassed for canned-extrusion, is non-pyrophoric, has good flow characteristics and exhibits relatively high apparent or tap density.

The wide and different ranges of compositions capable of being produced in accordance with the method of the invention are almost boundless. As has been indicated hereinbefore, the extent of limited liquid or solid solubility of the constituents does not present the problems which are normally confronted with conventionally alloying techniques. The recovery of chemical constituents making up the composition is more predictable than by conventional melting techniques and the constituents are not subject to separation during mechanical handling. An example is the addition of graphite to various metals.

The invention through the technique of successive dry milling operations and the successive introduction of ingredients, also provides a means for combining two incompatible phases or metallic compositions in the same alloy by separating them with a third mutually compatible phase or metallic composition. Bearing in mind that harder and/or less ductile constituents will tend to become dispersed within softer and/or more ductile constituents, many combinations of consituents may be utilized in a hierarchy. Such a hierarchical composite may be combined with one or more other hierarchical composites in a common matrix. In this way, novel structures may be produced which cannot be made in any other way.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. The process for producing wrought composite particles having an interdispersed internal structure which comprises mixing a compressively deformable metallic powder with at least one other powdered material from the group consisting of a non-metallic material and another metallic material and dry milling the mixture under conditions of repeated mutual impact compression sufficiently energetic to substantially reduce the thickness of at least the compressively deformable metallic constituents of said mixture and for a time sufficient to produce non-pyrophoric wrought composite particles individually having substantially the composition of said mixture.

2. The process according to claim 1 wherein said dry milling is continued for a time sufficient to produce wrought composite metal particles having a hardness of at least about one-half of the difference between its saturated hardness and its base hardness, said base hardness being that hardness determined by extrapolating to zero time an arithmetic plot of hardness data obtained as a function of time under substantially the same conditions.

3. A dry milling process for producing composite metal particles which comprises:
providing a dry charge of attritive elements and a powder mass comprising a plurality of constituents of melting point exceeding about 600° K., at least one constituent being a compressively deformable metal in an amount of at least 15% by volume of said powder mass with the remainder of said powder mass being at least one other constituent selected from the group consisting of a non-metal and another metal,
the volume ratio of attritive elements to the powder mass being at least about 4 to 1,
the volume of the powder mass being substantially less than the dynamic interstitial volume of the space between the attritive elements during milling,
subjecting said charge to agitation milling under conditions in which a substantial portion of said attritive elements is maintained kinetically in a highly activated state of relative motion,
and continuing said milling to produce dense composite metal particles of substantially saturation hardness, said particles being characterized metallographically by an internal structure comprising said constituents intimately united and interdispersed.

4. The process of claim 3, wherein said non-metal is a substantially stable high melting point refractory compound.

5. The process of claim 3, wherein at least one of said constituents is capable of alloying with the deformable metal by diffusion heat treatment.

6. The process of claim 5, wherein the constituents are metals and alloying elements proportioned to provide a desired alloy composition when the composite metal particles are subjected to diffusion heat treatment.

7. The process of claim 3, wherein the milling is carried out for a time sufficient to provide composite metal particles in which the constituents are spaced from each other at average distances of less than 10 microns.

8. The process of claim 7, wherein the milling time is such that the average distance between phases ranges up to about 1 micron.

9. A dry milling process for producing wrought composite metal particles which comprises:
providing a dry charge of attritive elements and a powder mass of predetermined composition comprising a plurality of constituents, at least one of said constituents being a compressively deformable metal in an amount of at least 15% by volume and with the remainder of said powder mass being at least one other constituent from the group consisting of a non-metal and another metal, said metals having a melting point of at least 1000° K.,
the volume ratio of the attritive elements to the powder mass being at least about 10 to 1, the volume of the powder mass being substantially less than the dynamic interstitial volume of the space between the attritive elements during milling,
subjecting said charge to agitation milling under conditions in which a substantial portion of said attritive elements is maintained kinetically in a highly activated state of relative motion, whereby to cause said constituents to unite and form composite metal particles,
and continuing said milling until cold worked composite metal particles are produced characterized by substantially saturation hardness and by an internal structure in which the constituents are intimately interdispersed.

10. The process of claim 9, wherein said other constituent is a non-metal and is a substantially stable high melting point refractory compound.

11. The process of claim 9, wherein the constituents are metals and alloying elements proportioned to provide a desired alloy composition when the composite metal particles are subjected to diffusion heat treatment.

12. The process of claim 9 wherein said metallic constituents are proportioned to provide an alloy based upon at least one metal from the group consisting of iron, nickel, cobalt, columbium, tungsten, tantalum, moylbdenum, chromium and precious metals of the platinum group.

13. A process for producing heavily cold worked composite metal particles which comprises: providing a dry charge of attritive ball elements and a powder mass comprising a plurality of metallic constituents, said constituents comprising by weight up to about 65% chromium, up to about 8% aluminum, up to about 8% titanium, up to about 40% molybdenum, up to about 40% tungsten, up to about 20% columbium, up to about 30% tantalum, up to about 40% copper, up to about 2% vanadium, up to about 15% manganese up to about 2% carbon, up to about 1% silicon, up to about 1% boron, up to about 2% zirconium, up to about 0.5% magnesium, up to about 10% by volume of a refractory compound, and the balance of the composition essentially at least about 25% by weight of at least one metal from the group consisting of iron, nickel and cobalt, the volume ratio of ball elements to the powder mass being at least 10 to 1, subjecting said charge to agitation milling under conditions in which a substantial portion of said attritive elements is maintained kinetically in a highly actvated state of relatve motion, and continuing said milling to produce heavily cold worked composite metal particles of substantially saturation hardness for the system involved and characterized metallographically by an internal structure in which the constituents are intimately united and interdispersed.

14. The process of claim 13, wherein the powder mass contains essentially 0.5% to 10% by volume of a refractory compound, up to about 65% chromium, and the balance essentially metal from the group consisting of nickel, iron and cobalt.

15. The process of claim 14, wherein the refractory compound is thoria in an amount ranging from about 0.5% to 5% by volume.

16. The process of claim 13 wherein said metallic constituents are proportioned to provide a heat-resistant alloy composition from the group consisting of nickel-chromium, cobalt-chromium and iron-chromium alloys.

17. The process of claim 16 wherein said metallic constituents contain at least one metal from the group consisting of molybdenum, tungsten, columbium, tantalum, aluminum, titanium and zirconium.

18. The process of claim 13 wherein said metallic constituents are proportioned to provide a metal system in which the metal constituents have limited solubility in each other.

19. The process of claim 18 wherein said systems are selected from the group consisting of lead-copper, copper-iron, copper-tungsten, copper-chromium and silver-tungsten.

20. The process of claim 13 wherein said metallic constituents are proportioned to provide a nickel-base, precipitation-hardenable superalloy.

21. The process of claim 13 wherein said constituents are proportioned to provide a stainless steel.

22. The process of claim 13 wherein said constituents are proportioned to provide a high carbon tool steel.

23. The process of claim 13 wherein said constituents are proportioned to provide a maraging steel.

24. The process of claim 13 wherein said constituents are proportioned to provide a carbide tool composition.

25. The process of claim 13 wherein said constituents are proportioned to provide an iron-aluminum heat resistant alloy.

26. A dry milling process for producing wrought composite metal particles which comprises:

providing a dry charge of attritive elements and a powder mass comprising at least one compressively deformable metal of melting point above 1000° K., oxygen, and a refractory oxide-forming metal whose negative free energy of formation of the oxide is at least about 90,000 calories per gram atom of oxygen, the volume ratio of attritive elements to the powder mass being at least about 4 to 1, the volume of the powder mass being substantially less than the dynamic interstitial volume of the space between the attritive elementes during milling, subjecting said charge to agitation milling under conditions in which a substantial portion of said attritive elements is maintained kinetically in a highly activated state of relative motion, continuing said milling to produce dense composite metal particles of substantially saturation hardness, said particles being characterized metallographically by an internal structure comprising said constituents intimately united and interdispersed, and then heating said particles to react said oxygen with the refractory oxide-forming metal, whereby said composite metal particles are characterized by a dispersion of refractory oxide throughout the internal structure thereof.

27. The process of claim 26, wherein the deformable metals are an iron-group metal and up to about 65% chromium, said oxygen is supplied as an agent from the group of mechanically alloyed oxygen and an iron-group metal oxide and the refractory oxide-forming metal is present in an amount at least sufficient to react with said oxygen and be converted to a dispersion of refractory oxide.

References Cited
UNITED STATES PATENTS
2,853,767   9/1958   Burkhammer _____ 75—0.5 BA L. DEWAYNE RUTLEDGE, Primary Examiner
W. W. STALLARD, Assistant Examiner U.S. Cl. X.R.
75—0.5 B, 0.5 BA, 0.5 BB, 0.5 BC

UNITED STATES PATENT OFFICE
CERTIFICATE OF CORRECTION

PO-1050 (5/69)

Patent No. 3,723,092　　　　　　　　　Dated March 27, 1973

Inventor(s) JOHN STANWOOD BENJAMIN

It is certified that error appears in the above-identified patent and that said Letters Patent are hereby corrected as shown below:

Col. 15, line 67, for the comma (,) read a period (.).

Col. 19, line 35, for "of" read --or--.

Col. 20, line 39, for "zirocnium" read --zirconium--.

Claim 12, line 4, for "moylb-" read --molyb---.

Claim 13, line 20, for "actvated" read --activated--.

Signed and sealed this 27th day of November 1973.

(SEAL)
Attest:

EDWARD M. FLETCHER, JR.
Attesting Officer

RENE D. TEGTMEYER
Acting Commissioner of Patents